United States Patent
Xu et al.

(10) Patent No.: US 11,778,649 B2
(45) Date of Patent: Oct. 3, 2023

(54) HANDLING OF ABSENCE OF INTERFERENCE FOR CROSS-LINK INTERFERENCE MEASUREMENT

(71) Applicant: QUALCOMM Incorporated, San Diego, CA (US)

(72) Inventors: Huilin Xu, Temecula, CA (US); Umesh Phuyal, San Diego, CA (US); Lei Xiao, San Jose, CA (US); Jing Lei, San Diego, CA (US); Qunfeng He, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/351,196

(22) Filed: Jun. 17, 2021

(65) Prior Publication Data
US 2022/0015114 A1   Jan. 13, 2022

Related U.S. Application Data

(60) Provisional application No. 63/050,584, filed on Jul. 10, 2020.

(51) Int. Cl.
*H04B 17/345* (2015.01)
*H04W 24/10* (2009.01)
*H04W 72/54* (2023.01)

(52) U.S. Cl.
CPC .......... *H04W 72/54* (2023.01); *H04B 17/345* (2015.01); *H04W 24/10* (2013.01)

(58) Field of Classification Search
None
See application file for complete search history.

(56) References Cited

U.S. PATENT DOCUMENTS

| 11,425,734 B2 * | 8/2022 | Yasukawa | H04W 24/10 |
| 2018/0220458 A1 * | 8/2018 | Ouchi | H04L 27/01 |

(Continued)

FOREIGN PATENT DOCUMENTS

| CN | 113709868 A | * 11/2021 |
| EP | 3667957 A1 | 6/2020 |
| WO | WO-2020211933 A1 | * 10/2020 |

OTHER PUBLICATIONS

3GPP TS 38.331: "3rd Generation Partnership Project; Technical Specification Group Radio Access Network; NR; Radio Resource Control (RRC) Protocol specification (Release 16)", 3GPP TS 38.331, V16.0.0 (Mar. 2020), Apr. 6, 2020 (Apr. 6, 2020), 3GPP Standard, Technical Specification, 3GPP TS 38.331, 3rd Generation Partnership Project (3GPP), Mobile Competence Centre, 650, Route Des Lucioles, F-06921 Sophia-Antipolis Cedex, France, vol. RAN WG2, No. V16.0.0, Apr. 6, 2020 (Apr. 6, 2020), 832 pages, XP051893854, Retrieved from the Internet: URL: http://ftp.3gpp.org/Specs/archive/38_series/38.331/38331-g00.zip 38331-g00.docx [retrieved on Apr. 6, 2020] Paragraph [0735], section 5.5.1, Paragraph "5.5.4.4 Event A3", Paragraph "5.5.4.5 Event A4", Paragraph "5.5.4.6 Event A5", section 5.5.1, section 5.5.5.1.

(Continued)

*Primary Examiner* — Ajit Patel
*Assistant Examiner* — Liem H. Nguyen
(74) *Attorney, Agent, or Firm* — Holland & Hart LLP/Qualcomm Incorporated

(57) ABSTRACT

Methods, systems, and devices for wireless communications are described. Generally, the described techniques provide for measuring, filtering, and reporting cross-link interference (CLI) in cases where not all aggressor user equipments (UEs) are transmitting signals that can be measured by a victim UE. A UE may obtain a set of CLI measurements by performing CLI measurements during a set of CLI measurement occasions. The UE may determine a first subset of the (Continued)

set of CLI measurements that satisfy a CLI measurement threshold and a second subset of the set of CLI measurements that do not satisfy the CLI measurement threshold. The UE may apply a filter to the first subset of the set of CLI measurements, and suppress the filter for the second subset of the set of CLI measurements, to obtain a filtered CLI measurement value. The UE may transmit the filtered CLI measurement value to a base station.

28 Claims, 18 Drawing Sheets

(56) References Cited

U.S. PATENT DOCUMENTS

| | | | |
|---|---|---|---|
| 2019/0260486 A1* | 8/2019 | Kang | H04L 5/0007 |
| 2020/0112420 A1* | 4/2020 | Xu | H04L 5/0073 |
| 2020/0169435 A1* | 5/2020 | Kang | H04L 27/2607 |
| 2021/0006438 A1* | 1/2021 | Harrebek | H04W 24/10 |
| 2021/0160891 A1* | 5/2021 | Yasukawa | H04L 5/0073 |
| 2021/0392530 A1* | 12/2021 | Shi | H04B 17/318 |
| 2022/0030522 A1* | 1/2022 | Vejlgaard | H04W 52/245 |
| 2022/0046459 A1* | 2/2022 | Kim | H04L 1/0026 |
| 2022/0174528 A1* | 6/2022 | Sedin | H04L 5/0048 |
| 2022/0368435 A1* | 11/2022 | Jin | H04B 17/382 |
| 2022/0386156 A1* | 12/2022 | Park | H04W 24/10 |
| 2023/0030518 A1* | 2/2023 | Ren | H04W 52/243 |

OTHER PUBLICATIONS

Huawei, et al., "On the Impact of DRX on CLI SRS-RSRP Measurement," 3GPP Draft, 3GPP TSG-RAN2 Meeting #110 electronic, R2-2005309, 3rd Generation Partnership Project (3GPP), Mobile Competence Centre, 650, Route Des Lucioles, F-06921, Sophia-Antipolis Cedex, France, vol. RAN WG2, No. electronic; Jun. 1, 2020-Jun. 12, 2020, May 21, 2020 (May 21, 2020), XP051887589, 28 pages, Retrieved from the Internet: URL: https://ftp.3gpp.org/tsg_ran/WG2_RL2/TSGR2_110-e/Docs/R2-2005309.zip R2-2005309.doc [retrieved on May 21, 2020] section 2.1 section 2.2, Alternative 1.
International Search Report and Written Opinion—PCT/US2021/038138—ISA/EPO—dated Oct. 22, 2021.

* cited by examiner

HANDLING OF ABSENCE OF INTERFERENCE FOR CROSS-LINK INTERFERENCE MEASUREMENT

CROSS REFERENCE

The present Application for Patent claims the benefit of U.S. Provisional Patent Application No. 63/050,584 by XU et al., entitled "HANDLING OF ABSENCE OF INTERFERENCE FOR CROSS-LINK INTERFERENCE MEASUREMENT," filed Jul. 10, 2020, assigned to the assignee hereof, and expressly incorporated by reference herein.

FIELD OF TECHNOLOGY

The following relates generally to wireless communications and more specifically to handling of absence of interference for cross-link interference measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). A carrier may be configured for operation according to time division duplexing (TDD), and various UEs may operate using the same or different TDD configurations.

SUMMARY

The described techniques relate to improved methods, systems, devices, and apparatuses that support handling of absence of interference for cross-link interference (CLI) measurement. Generally, the described techniques provide for measuring, filtering, and reporting CLI in cases where not all aggressor user equipments (UEs) are transmitting signals that can be measured by a victim UE. A UE may obtain a set of CLI measurements by performing CLI measurements during a set of CLI measurement occasions. The UE may determine a first subset of the set of CLI measurements that satisfy a CLI measurement threshold and a second subset of the set of CLI measurements that do not satisfy the CLI measurement threshold. The UE may apply a filter to the first subset of the set of CLI measurements, and suppress the filter for the second subset of the set of CLI measurements, to obtain a filtered CLI measurement value. The UE may transmit the filtered CLI measurement value to a base station (e.g., in a CLI measurement report). The base station may receive the CLI measurement report, and may schedule communications with the UE and any other UEs (e.g., other victim UEs, other aggressor UEs, or the like) based on the CLI measurement report.

A method of wireless communications at a UE is described. The method may include obtaining a set of CLI measurements based on a corresponding set of CLI measurement occasions, determining a first subset of the set of CLI measurements that satisfy a cross-link measurement threshold, applying a filter to the first subset of the set of CLI measurements to obtain a filtered CLI measurement value, and transmitting the filtered CLI measurement value to a base station.

An apparatus for wireless communications at a UE is described. The apparatus may include a processor, memory coupled with the processor, and instructions stored in the memory. The instructions may be executable by the processor to cause the apparatus to obtain a set of CLI measurements based on a corresponding set of CLI measurement occasions, determine a first subset of the set of CLI measurements that satisfy a cross-link measurement threshold, apply a filter to the first subset of the set of CLI measurements to obtain a filtered CLI measurement value, and transmit the filtered CLI measurement value to a base station.

Another apparatus for wireless communications at a UE is described. The apparatus may include means for obtaining a set of CLI measurements based on a corresponding set of CLI measurement occasions, determining a first subset of the set of CLI measurements that satisfy a cross-link measurement threshold, applying a filter to the first subset of the set of CLI measurements to obtain a filtered CLI measurement value, and transmitting the filtered CLI measurement value to a base station.

A non-transitory computer-readable medium storing code for wireless communications at a UE is described. The code may include instructions executable by a processor to obtain a set of CLI measurements based on a corresponding set of CLI measurement occasions, determine a first subset of the set of CLI measurements that satisfy a cross-link measurement threshold, apply a filter to the first subset of the set of CLI measurements to obtain a filtered CLI measurement value, and transmit the filtered CLI measurement value to a base station.

Some examples of the method, apparatuses, and non-transitory computer-readable medium described herein may further include operations, features, means, or instructions for determining a second subset of the set of CLI measurements that do not satisfy the cross-link measurement threshold, and suppressing the filter for the second subset of the set of CLI measurements, where the filtered CLI measurement value may be based on suppressing the filter for the second subset of the set of CLI measurements.

In some examples of the method, apparatuses, and non-transitory computer-readable medium described herein, applying the filter may include operations, features, means, or instructions for adjusting a coefficient value for a current CLI measurement of the first subset of the set of CLI measurements based on a number of cross-link measurements in the second subset of the set of CLI measurements.

Some examples of the method, apparatuses, and non-transitory computer-readable medium described herein may further include operations, features, means, or instructions for performing a first CLI measurement, initiating a counter based on determining the first CLI measurement may be in the first subset of the set of CLI measurements, performing one or more additional CLI measurements, and incrementing the counter for each of the one or more additional CLI measurements based on determining that the one or more additional CLI measurements may be in the second subset of the set of CLI measurements.

Some examples of the method, apparatuses, and non-transitory computer-readable medium described herein may further include operations, features, means, or instructions for performing a second CLI measurement subsequent to the one or more additional CLI measurements, and resetting the counter based on determining that the second CLI measurement may be in the first subset of the set of CLI measurements.

In some examples of the method, apparatuses, and non-transitory computer-readable medium described herein, applying the filter may include operations, features, means, or instructions for adjusting a coefficient value for the second CLI measurement of the first subset of the set of CLI measurements based on a last value of the counter prior to resetting the counter.

Some examples of the method, apparatuses, and non-transitory computer-readable medium described herein may further include operations, features, means, or instructions for determining, based on incrementing the counter, that an incremented counter value satisfies a counter threshold, generating, based on determining that the incremented counter value satisfies the counter threshold, a CLI measurement value indicating a lack of detected CLI, and transmitting the CLI measurement value to the base station.

Some examples of the method, apparatuses, and non-transitory computer-readable medium described herein may further include operations, features, means, or instructions for performing a second CLI measurement subsequent to the one or more additional CLI measurements, and setting a coefficient value equal to one for the second CLI measurement based on determining that the incremented counter value satisfies the counter threshold, where applying the filter to the first subset of the set of CLI measurements may be based on the coefficient value.

Some examples of the method, apparatuses, and non-transitory computer-readable medium described herein may further include operations, features, means, or instructions for incrementing a first counter for each CLI measurement of the first subset of the set of CLI measurements to obtain a first counter value, and incrementing a second counter for each CLI measurement of the second subset of the set of CLI measurements to obtain a second counter value.

In some examples of the method, apparatuses, and non-transitory computer-readable medium described herein, transmitting the filtered CLI measurement value may include operations, features, means, or instructions for transmitting a CLI measurement report including the filtered CLI measurement value and an indication of the first counter value, the second counter value, a ratio between the first counter value and the second counter value, a relationship between the first counter value and the second counter value, or any combination thereof.

Some examples of the method, apparatuses, and non-transitory computer-readable medium described herein may further include operations, features, means, or instructions for determining that a first ratio between the first counter value and the second counter value or a second ratio between the first counter value and a sum of the first counter value and the second counter value, or a third ratio between the second counter value and a sum of the first counter value and the second counter value satisfies a threshold value, where transmitting the filtered CLI measurement value may be based on determining that the first ratio or the second ratio satisfies the threshold value.

Some examples of the method, apparatuses, and non-transitory computer-readable medium described herein may further include operations, features, means, or instructions for resetting, based on transmitting the filtered CLI measurement value to the base station, the first counter and the second counter.

A method of wireless communications at a base station is described. The method may include configuring, for a UE a set of CLI measurement occasions for a set of cross-link measurements, receiving, from the UE based on configuring the set of CLI measurement occasions, a CLI measurement report including a filtered CLI measurement value corresponding to the set of CLI measurement occasions and an indication of at least a first counter value associated with a first subset of measurements associated with the set of CLI measurement occasions that satisfy a CLI measurement threshold or a second counter value associated with a second subset of measurements associated with the set of CLI measurement occasions that do not satisfy the CLI measurement threshold, and scheduling communications for the UE and at least a second UE based on receiving the CLI measurement report.

An apparatus for wireless communications at a base station is described. The apparatus may include a processor, memory coupled with the processor, and instructions stored in the memory. The instructions may be executable by the processor to cause the apparatus to configure, for a UE a set of CLI measurement occasions for a set of cross-link measurements, receive, from the UE based on configuring the set of CLI measurement occasions, a CLI measurement report including a filtered CLI measurement value corresponding to the set of CLI measurement occasions and an indication of at least a first counter value associated with a first subset of measurements associated with the set of CLI measurement occasions that satisfy a CLI measurement threshold or a second counter value associated with a second subset of measurements associated with the set of CLI measurement occasions that do not satisfy the CLI measurement threshold, and schedule communications for the UE and at least a second UE based on receiving the CLI measurement report.

Another apparatus for wireless communications at a base station is described. The apparatus may include means for configuring, for a UE a set of CLI measurement occasions for a set of cross-link measurements, receiving, from the UE based on configuring the set of CLI measurement occasions, a CLI measurement report including a filtered CLI measurement value corresponding to the set of CLI measurement occasions and an indication of at least a first counter value associated with a first subset of measurements associated with the set of CLI measurement occasions that satisfy a CLI measurement threshold or a second counter value associated with a second subset of measurements associated with the set of CLI measurement occasions that do not satisfy the CLI measurement threshold, and scheduling communications for the UE and at least a second UE based on receiving the CLI measurement report.

A non-transitory computer-readable medium storing code for wireless communications at a base station is described. The code may include instructions executable by a processor to configure, for a UE a set of CLI measurement occasions for a set of cross-link measurements, receive, from the UE based on configuring the set of CLI measurement occasions, a CLI measurement report including a filtered CLI measurement value corresponding to the set of CLI measurement occasions and an indication of at least a first counter value associated with a first subset of measurements associated with the set of CLI measurement occasions that satisfy a CLI measurement threshold or a second counter value associated with a second subset of measurements associated with the set of CLI measurement occasions that do not satisfy the CLI measurement threshold, and schedule communications for the UE and at least a second UE based on receiving the CLI measurement report.

In some examples of the method, apparatuses, and non-transitory computer-readable medium described herein, the CLI measurement report further may include operations, features, means, or instructions for an indication of a relationship between the first counter value and the second counter value including a first ratio between the first counter value and the second counter value, a second ratio between the first counter value and a sum of the first counter value and the second counter value, a third ratio between the second counter value and a sum of the first counter value and the second counter value, or a combination thereof.

In some examples of the method, apparatuses, and non-transitory computer-readable medium described herein, the CLI measurement report includes an indication of a lack of detected CLI during the set of CLI measurement occasions.

Some examples of the method, apparatuses, and non-transitory computer-readable medium described herein may further include operations, features, means, or instructions for receiving the CLI measurement report may be based on the second counter value satisfying a maximum counter value.

DETAILED DESCRIPTION

Figure 1:
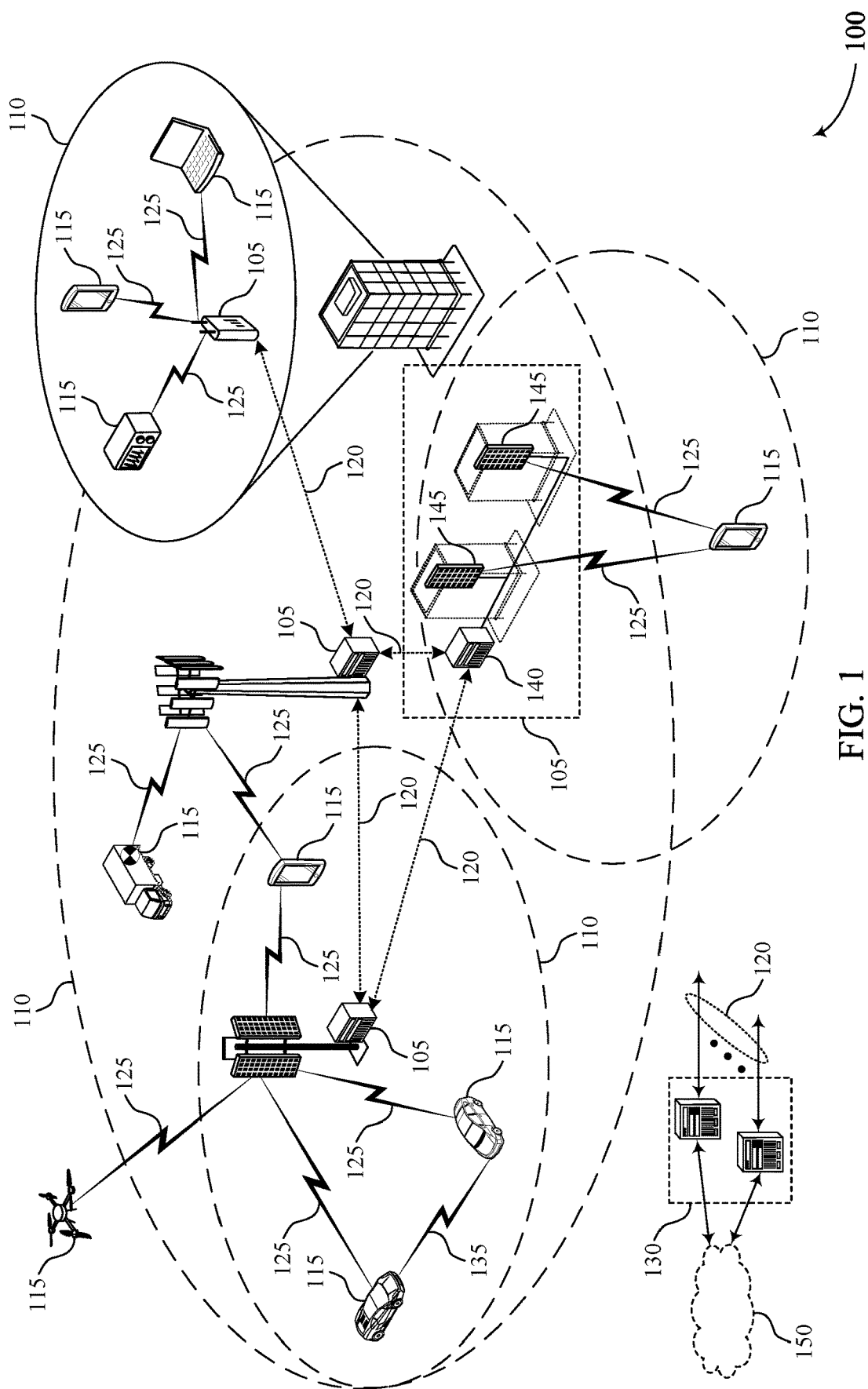
FIG. 1 illustrates an example of a system for wireless communications that supports handling of absence of interference for cross-link interference (CLI) measurement in accordance with aspects of the present disclosure.

In some examples of a wireless communications system, a user equipment (UE) may cause cross-link interference (CLI) to another UE. A base station may configure CLI measurement resources for measuring CLI, and a victim UE may perform CLI measurements during the CLI measurement resources (e.g., during one or more CLI measurement occasions). During a CLI measurement occasion, an aggressor UE may send an uplink transmission (e.g., a sounding reference signal (SRS)) and a victim UE may measure the strength of the CLI during that resource. However, an aggressor UE configured to transmit signals for CLI measurement may be in a sleep mode of a discontinuous reception (DRX) cycle during one or more CLI measurement occasions, or may fail to gain access to an unlicensed spectrum during one or more CLI measurement occasions. In such cases, the aggressor UE may not transmit anything during the CLI measurement occasion, resulting in nothing for the victim UE to measure. CLI measurement values filtered and reported by the victim UE may be inaccurate based on lack of CLI measurements in such cases.

According to aspects described herein, the victim UE may identify CLI measurement occasions during which one or more aggressor UEs do not send any transmission, and may filter CLI measurements accordingly. For example, a victim UE may identify a threshold CLI measurement value, and may discard any CLI measurements that do not satisfy the threshold. That is, the victim UE may refrain from updating a filtered CLI measurement value based on determining that a CLI measurement is below the threshold CLI measurement value. In some examples, a weighted coefficient value may be adjusted based on how many CLI measurements are discarded or how much time has elapsed since a last CLI measurement value that satisfies the threshold CLI measurement value. A counter may be defined to identify a number of CLI measurements that do not satisfy the threshold since a previous CLI measurement that does satisfy the threshold. In some cases, if the counter reaches a threshold value, then the UE may transmit a measurement result value that indicates no CLI detection. In such cases, the UE may then set the weighted coefficient value equal to one in filtering the next CLI measurement that does satisfy the CLI measurement threshold. In some examples, the UE may initiate a first counter for CLI measurements that do satisfy the CLI measurement threshold, and a second counter for CLI measurements that do not satisfy the CLI measurement threshold. In some examples, the UE may transmit the filtered CLI measurement as well as an indication of a first counter value for the first counter value, a second counter value for the second counter, both, or a relationship between the two counter values (e.g., a ratio). Such counter values may reflect how often a physical measurement result satisfies the CLI measurement threshold.

Aspects of the disclosure are initially described in the context of wireless communications systems. Aspects of the disclosure are further illustrated by and described with reference to timelines and process flows. Aspects of the disclosure are further illustrated by and described with reference to apparatus diagrams, system diagrams, and flowcharts that relate to handling of absence of interference for CLI measurement.

FIG. 1 illustrates an example of a wireless communications system 100 that supports handling of absence of interference for CLI measurement in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may measure CLI even where not all aggressor UEs 115 are transmitting signals that can be measured by a victim UE 115. A UE 115 may obtain a set of CLI measurements by performing CLI measurements during a set of CLI measurement occasions. The UE 115 may determine a first subset of the set of CLI measurements that satisfy a CLI measurement threshold and a second subset of the set of CLI measurements that do not satisfy the CLI measurement threshold. The UE 115 may apply a filter to the first subset of the set of CLI measurements, and suppress the filter for the second subset of the set of CLI measurements, to obtain a filtered CLI measurement value. The UE 115 may transmit the filtered CLI measurement value to a base station 105 (e.g., in a CLI measurement report). The base station 105 may receive the CLI measurement report, and may schedule communications with the UE 115 and any other UEs 115 (e.g., other victim UEs 115, other aggressor UEs 115, or the like) based on the CLI measurement report.

Figure 2:
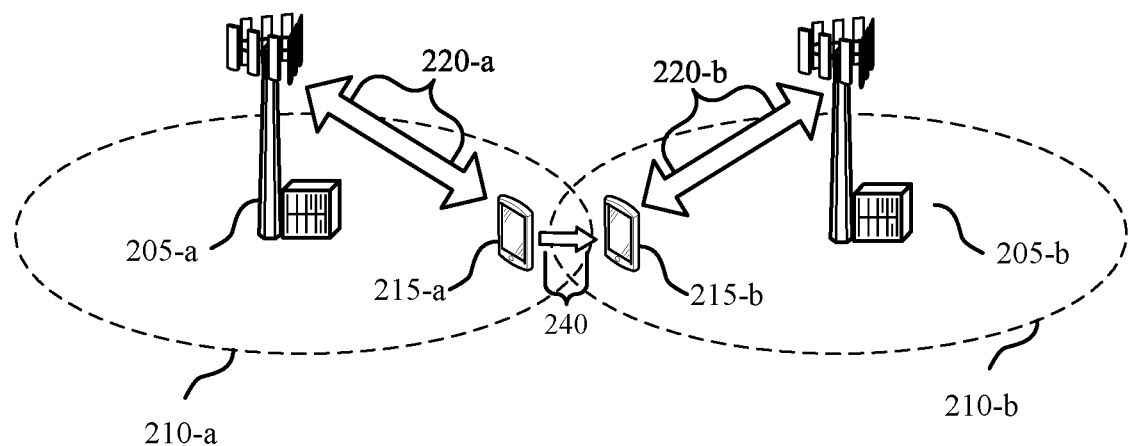
FIG. 2 illustrates an example of a wireless communications system that supports handling of absence of interference for CLI measurement in accordance with aspects of the present disclosure.
Figure 2:
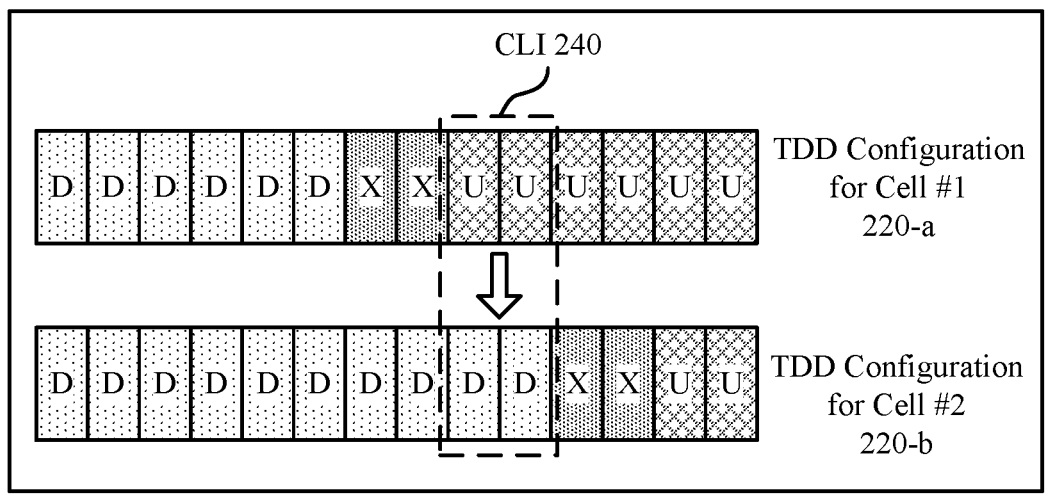

FIG. 2 illustrates an example of a wireless communications system 200 that supports CLI measurement configuration in accordance with aspects of the present disclosure. In some examples, wireless communications system 200 may implement aspects of wireless communications system 100. The wireless communications system 200 may include a UE 215-*a* and a UE 215-*b*, which may be examples of a UE 215 as described herein. The wireless communications system 200 may also include a base station 205-*a* and a base station 205-*b* which may be examples of a base station 205 as described herein. The base stations 205 may each be associated with a cell which provides wireless communications with the base station 205 within a respective coverage area 210. Although illustrated with reference to FIG. 2 as two separate base stations, in some examples, base station 205-*a* and base station 205-*b* may be the same base station. Techniques described herein may be performed by a single base station, or two separate base stations, or two co-located base stations, or the like.

The wireless communications system 200 may employ TDD communications where a wireless communications channel is used for both uplink transmissions and downlink transmissions. Each cell may configure a TDD configuration 220 for the cell. For example, the first cell of base station 205-*a* may use a first TDD configuration 220-*a*, and the second cell of base station 205-*b* may use a second TDD configuration 220-*b*. UEs 215 in these cells may communicate with the base stations based on the corresponding TDD configuration 220. For example, a slot of a TDD configuration 220 may include symbol periods for downlink symbols 225, flexible symbols 230, uplink symbols 235, or any combination thereof. The base station 205 may transmit downlink signals in a downlink symbol 225, and the UE 215 may transmit uplink signals in an uplink symbol 235. Flexible symbols 230 may, in some cases, be used as guard periods between the uplink transmissions and downlink transmissions. A guard period may prevent inter-symbol interference or may provide time for a UE 215 to adjust radio frequency hardware, reconfigure antennas, or the like. In some cases, a flexible symbol 230 may be dynamically reconfigured to either a downlink symbol 225 or an uplink symbol 235.

A base station 205 may dynamically change the TDD configurations 220. In an example, the traffic in the first cell may shift toward being more uplink-heavy so the first TDD configuration 220-*a* of the first cell may change to using a slot configuration which has more uplink symbol periods. In some cases, a TDD configuration 220 may be dynamically indicated to UEs in the cell by a slot format indicator (SFI) in a downlink control information (DCI) transmission. The DCI transmission conveying the SFI may be transmitted in one of the first few downlink symbols 225 of the slot. Additionally, or alternatively, the TDD configuration 220 may be semi-statically configured (e.g., included in a radio resource control configuration) by higher layer signaling.

In some cases, different TDD configurations 220 used by neighboring cells may lead to conflicting transmission directions for some symbol periods of a slot. For example, the 9th and 10th symbol periods of the slot shown may have conflicting directions for the first TDD configuration 220-*a* and the second TDD configuration 220-*b*. The TDD configuration 220-*a* may have uplink symbols 235 configured when the TDD configuration 220-*b* has downlink symbols 225 configured. Therefore, UE 215-*a* in the first cell may be configured to transmit an uplink transmission while UE 215-*b* in the second cell is configured to receive a downlink transmission. The first cell and the second cell may be neighboring cells, and UE 215-*b* and UE 215-*a* may be near each other at the edge of their respective cell. In some cases, the uplink transmission of UE 215-*a* may cause CLI 240 to reception of the downlink transmission at UE 215-*b* at the conflicting symbol periods. Generally, differing TDD configurations 220 may result in CLI 240 when an uplink symbol of one UE collides with a downlink symbol of another nearby UE. CLI 240 may occur near or between cell edge UEs of nearby cells. CLI may also occur if different UEs are configured with different TDD configurations for a same cell. The UE 215 transmitting the uplink signal (e.g., UE 215-*a*) may be referred to as the aggressor UE 215, and the UE 215 which is receiving the affected downlink transmission (e.g., UE 215-*b*) may be referred to as the victim UE 215.

To manage CLI 240 in the wireless communications system, a victim UE 215 (e.g., UE 215-*b*) may perform a measurement process to determine one or more metrics of the CLI 240. In some such processes, the victim UE 215 may notify a serving base station 205 (e.g., 205-*b*) of potential interference. The serving base station 205 may then configure resources for measuring one or more metrics of the CLI 240 and transmit a message to the victim UE 215-*b* indicating the resources. The victim UE 215 may then perform a measurement of one or more metrics of the CLI 240. For example, the one or more metrics may include a reference signal receive power (RSRP), a received signal strength indicator (RSSI), a signal-to-interference-plus-noise (SINR), or similar power measurements in order to determine how much CLI 240 is affecting the victim UE 215. In some cases, the RSRP measurement may be performed on respective reference signals transmitted by the aggressor UE 215 (e.g., UE 215-*a*) for measuring CLI 240, while RSSI measurements may be performed to measure all interference sources including the reference signals transmitted by the aggressor UE 215 and other noise. RSSI measurements may be configured, for example, during uplink shared channel transmissions by the aggressor UE 215. Such reference signals may include sounding reference signals (SRSs), demodulation reference signals (DMRSs) for PUCCH or PUSCH or the like. For example, the aggressor UE 215 may transmit a first set of sounding reference signals (SRSs) to enable a victim UE 215 to measure an RSRP on the SRSs for determining the strength of CLI 240, a second set of SRSs to enable the victim UE 215 to measure an RSSI on the SRSs (e.g., SRSs for RSSI) for determining the strength of CLI 240, or any combination thereof. That is, a victim UE 215-*b* may measure SRS RSRP if CLI measurement resource is configured for SRS signaling. UE 215-*b* may also measure CLI RSSI if corresponding CLI RSSI measured resources are configured by the network (e.g., base station 205-*a*). A base station 205 may configure measurement resources (e.g., CLI measurement occasions), and may provide them in a measurement object (MO). The configuration may also include periodicity, frequency resource blocks (RBs), and OFDM symbols where CLI is to be measured.

In some cases, the CLI measurement resource may be associated with existing reference signals that a victim UE 215 measures to determine different metrics about the CLI 240. For example, the CLI measurement resource may include SRSs, DMRSs for PUCCH or PUSCH, or similar uplink signals that an aggressor wireless device transmits during one or more corresponding downlink symbols at the victim UE 215. Accordingly, the victim UE 215 may measure a strength of the CLI 240 based on one or more CLI measurement resources received from the aggressor wireless device. After determining the strength of the CLI 240, the victim UE 215 may report the CLI measurement to the serving base station 205. The serving base station 205 may then initiate a CLI management procedure whereby the CLI 240 is eliminated or otherwise considered.

While it is shown in FIG. 2 that each UE 215-*a* and UE 215-*b* are connected to a first and second cell with corresponding base stations 205-*a* and 205-*b*, respectively, different scenarios may exist where uplink transmissions from UE 215-*a* may cause CLI on downlink transmissions received by UE 215-*b*. The various techniques described herein may also be applied for other UE to base station connection topologies. For example, the victim UE 215 and an aggressor UE 215 may be located in a same cell, a neighboring cell of a homogenous deployment, or in a different cell of an overlapping or heterogeneous deployment.

In some examples, a UE 215 (e.g., a victim UE 215-*b*) may perform one or more CLI measurements across multiple CLI measurement occasions, and may filter the CLI measurements to obtain a filtered CLI measurement value, as described in greater detail with reference to FIG. 3.

Figure 3:
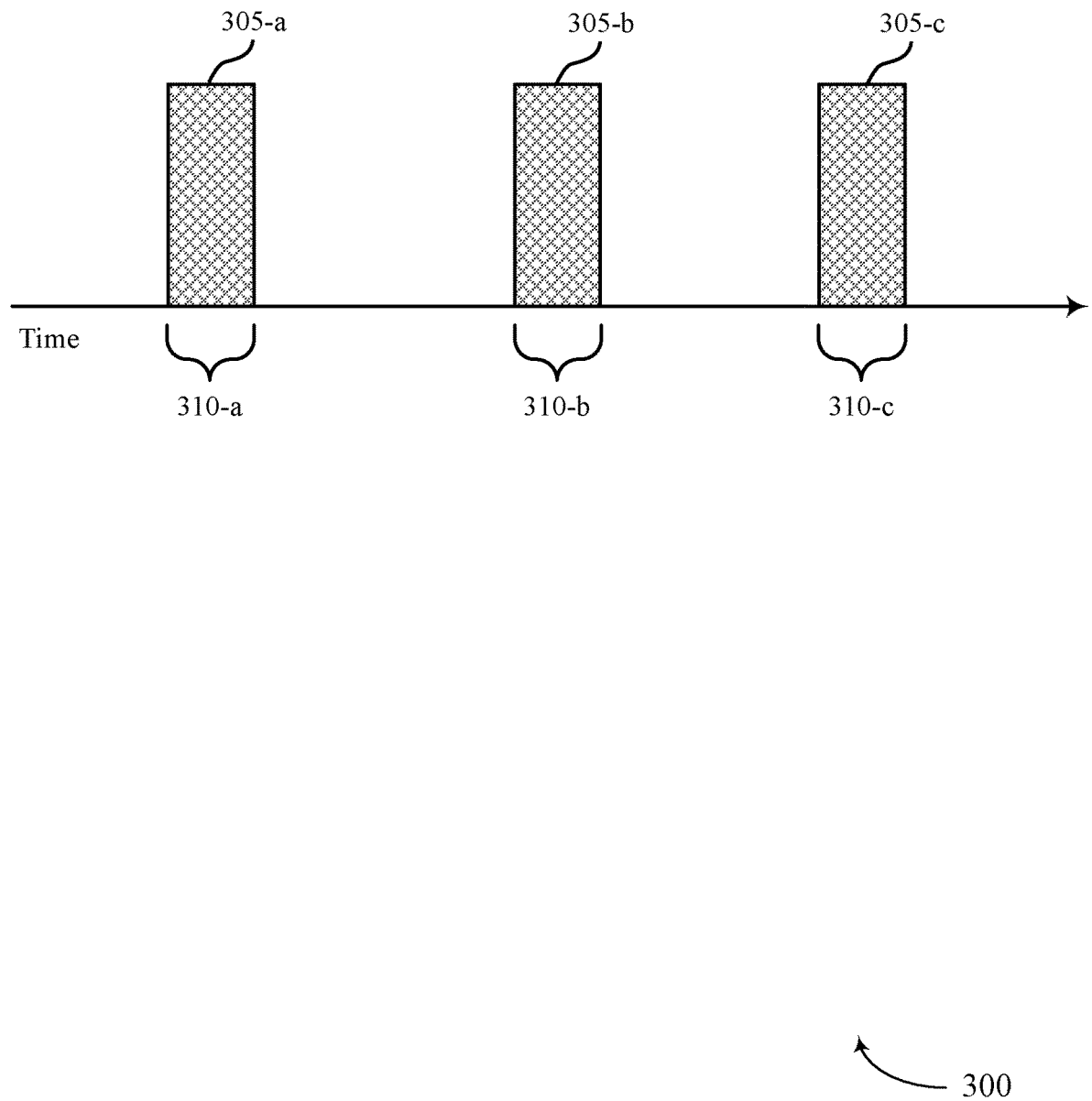
FIG. 3 illustrates an example of a timeline that supports handling of absence of interference for CLI measurement in accordance with aspects of the present disclosure.

FIG. 3 illustrates an example of a timeline 300 that supports handling of absence of interference for CLI measurement in accordance with aspects of the present disclosure. In some examples, timeline 300 may implement aspects of wireless communications system 100. In some examples, a UE 115 may implement aspects of timeline 300. Such a UE 115 may be an example of corresponding devices described with reference to FIGS. 1 and 2.

A base station 105 may configure, for one or more UEs, resources for performing CLI measurements (e.g., CLI measurement occasions 305). Each CLI measurement occasion may span one or more time, frequency, or spatial resources. For instance, CLI measurement occasion 305-*a* may have a duration of time period 310-*a*, CLI measurement occasions 305-*b* may have a duration of time period 310-*b*, and CLI measurement occasion 305-*c* may have a duration of time period 310-*c*. A UE 115 may perform CLI measurements (e.g., physical layer measurements such as layer one (L1) measurements) during each configured CLI measurement occasion 305. Physical layer measurements may include filtering according to one or more coefficients. For instance, UE 115 may generate a filtered CLI measurement value $F_n$ (e.g., an updated filtered measurement result on layer three (L3)) by performing a filtering procedure as follows: $F_n = (1-a) \cdot F_{n-1} + a \cdot M_n$, where $M_n$ represents a latest received or performed measurement result from the physical layer, $F_{n-1}$ represents an older filtered measurement result, $F_0$ is set to the first measurement result from the physical layer (e.g., within a period of time or for a number of CLI measurement occasions), and a represents a coefficient value for CLI measurement filtering (e.g., a coefficient of an L3 filter). A UE 115 may generate the filtered CLI measurement value $F_n$ and may use the filtered CLI measurement value for evaluation of reporting criteria, or measurement reporting. UE 115 may provide the filtered CLI measurement value or information based thereon to the base station (e.g., in a CLI measurement report message).

Thus, a UE 115 may perform one or more CLI measurement procedures during one or more CLI measurement occasions 305. For each CLI measurement, UE 115 may update the filtered CLI measurement value based on the latest CLI measurement. Over time (e.g., across CLI measurement occasion 305-*a*, CLI measurement occasion 305-*b*, and CLI measurement occasion 305-*c*), UE 115 may perform multiple CLI measurements and update the filtered CLI measurement value based on the multiple CLI measurements. The filtered CLI measurement may provide accurate information that reflects CLI experienced by the victim UE 115 over time. However, if the victim UE 115 is unable to detect any CLI during one or more CLI measurement occasions 305, then the filtered CLI measurement value may be inaccurate, as described in greater detail with reference to FIG. 4.

Figure 4:
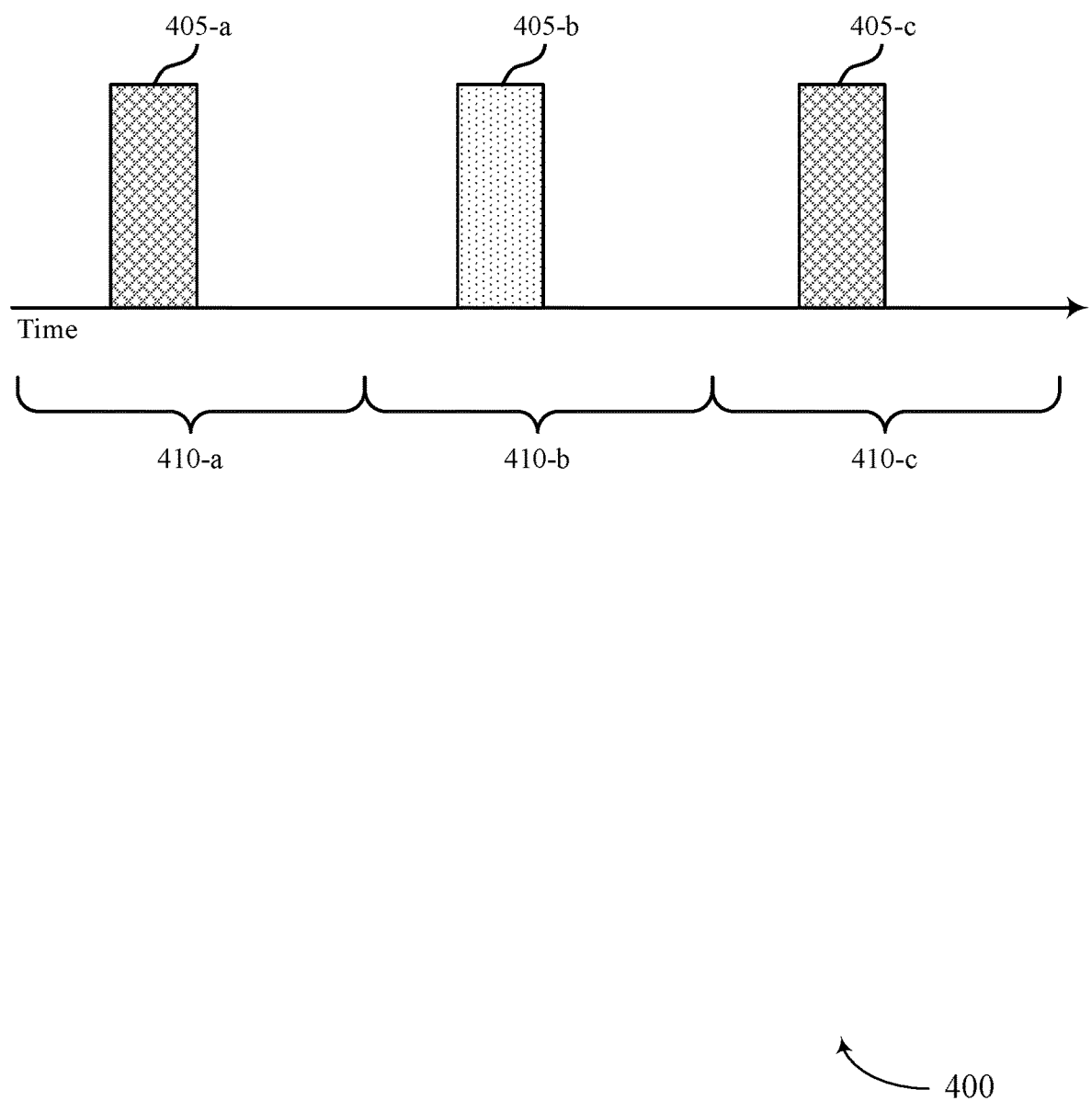
FIG. 4 illustrates an example of a timeline that supports handling of absence of interference for CLI measurement in accordance with aspects of the present disclosure.

FIG. 4 illustrates an example of a timeline 400 that supports handling of absence of interference for CLI measurement in accordance with aspects of the present disclosure. In some examples, timeline 400 may implement aspects of wireless communications system 100 and 200. In some examples, a UE 115 may implement aspects of timeline 400. Such a UE 115 may be an example of corresponding devices described with reference to FIGS. 1-3.

In some examples, a victim UE 115 may perform CLI measurements during configured CLI measurement occasions 405 (e.g., CLI measurement occasion 405-*a*, CLI measurement occasion 405-*b*, and CLI measurement occasion 405-*c*). CLI measurements may be similar to radio resource management (RRM) measurements for mobility. For instance, both RRM measurements and CLI measurements may follow layer 3 measurement and reporting mechanisms or protocols. Both RRM measurements and CLI measurements may be periodical, and may be based on RRC configuration of measurement resources (e.g., RRC configured CLI measurement occasions 405). However, RRM measurements and CLI measurements may also be different in some respects. For instance, RRM measurements may be performed on signaling transmitted by a base station, where base station operation may be continuous (e.g., may not enter idle or sleep modes). Thus, RRM measurements may always be received during configured resources. However, CLI measurements may be performed on signals transmitted by other aggressor UEs. Other UEs may not have continuous operation, or may not always have access to resources of CLI measurement occasions 405.

In some examples, an aggressor UE may be configured to operate in a discontinues reception (DRX) mode. For instance, during time period 410-*a*, the aggressor UE 115 may operate in an awake or DRX on mode. During time period 410-*b*, the aggressor UE 115 may operate in a sleep or DRX off mode. During time period 410-*c*, the aggressor UE 115 may wake up and again enter the DRX on mode. Thus, during CLI measurement occasion 405-*a* and CLI measurement occasion 405-*c*, the aggressor UE 415 may transmit one or more signals (e.g., SRSs) for CLI measurement by a victim UE 115. However, during CLI measurement occasion 405-*b*, the aggressor UE 115 may not transmit any uplink signals or utilize any uplink channels. As a result, a victim UE 115 may not detect any CLI during CLI measurement occasion 405-*b* (e.g., because the aggressor UE 115 may be operating in a sleep mode). In such examples, a filtered CLI measurement value may be inaccurate due to the lack of CLI (that would otherwise be generated by the aggressor UE 115) during CLI measurement occasions 405-*b*.

In some examples, an aggressor UE 115 may operate in unlicensed frequency (e.g., on an unlicensed frequency channel). The aggressor UE 115 may thus perform one or more procedures (e.g., a clear channel assessment (CCA) procedure) to attempt to gain access to the channel. Such procedures may or may not be successful. For instance, during time period 410-*a* (e.g., prior to CLI measurement occasion 405-*a*), an aggressor UE 115 may successfully gain access to an unlicensed channel, and may transmit one or more uplink signals during CLI measurement occasion 405-a. During time period 410-b (e.g., prior to CLI measurement occasion 405-b), the aggressor UE 115 may attempt to gain access to the unlicensed channel, but may be unable to gain access. Thus, the aggressor UE 115 may not be able to send any uplink transmissions during CLI measurement occasions 405-b. During time period 410-c (e.g., prior to CLI measurement occasion 405-c), the aggressor UE may again gain access to the unlicensed channel, and may transmit one or more uplink signals during CLI measurement occasion 405-c. As a result, a victim UE 115 may not detect any CLI during CLI measurement occasion 405-b (e.g., because the aggressor UE 115 could not gain access to the unlicensed channel). In such examples, a filtered CLI measurement value may be inaccurate due to the lack of CLI (that would otherwise be generated by the aggressor UE 115) during CLI measurement occasions 405-b.

In some examples, a victim UE may measure CLI from multiple aggressor UEs 115 at the same time. If one or more of the aggressor UEs 115 fails to send uplink signals during a CLI measurement occasion (e.g., due to a DRX cycle or failure to access the unlicensed channel), then a CLI measurement for that CLI measurement occasion may be inaccurate.

Inaccurate CLI measurements and resulting filtered CLI measurement values may result in an inaccurate CLI measurement report. Network devices (e.g., base stations 105) may not be able to accurately avoid CLI if CLI measurement reports are inaccurate. Further, base stations may not be able to successfully schedule various UEs, select appropriate beams for communication, or the like, to avoid or decrease CLI. This may result in increased interference in the system, increased system latency, decreased system efficiency, and decreased user experienced.

In some examples, to avoid inaccurate CLI measurements and resulting filtered CLI measurement values due to a lack of transmissions by one or more aggressor UEs 115, a victim UE may determine a threshold CLI measurement value, and may discard CLI measurements that do not satisfy the threshold, as described in greater detail with reference to FIG. 4.

Figure 5:
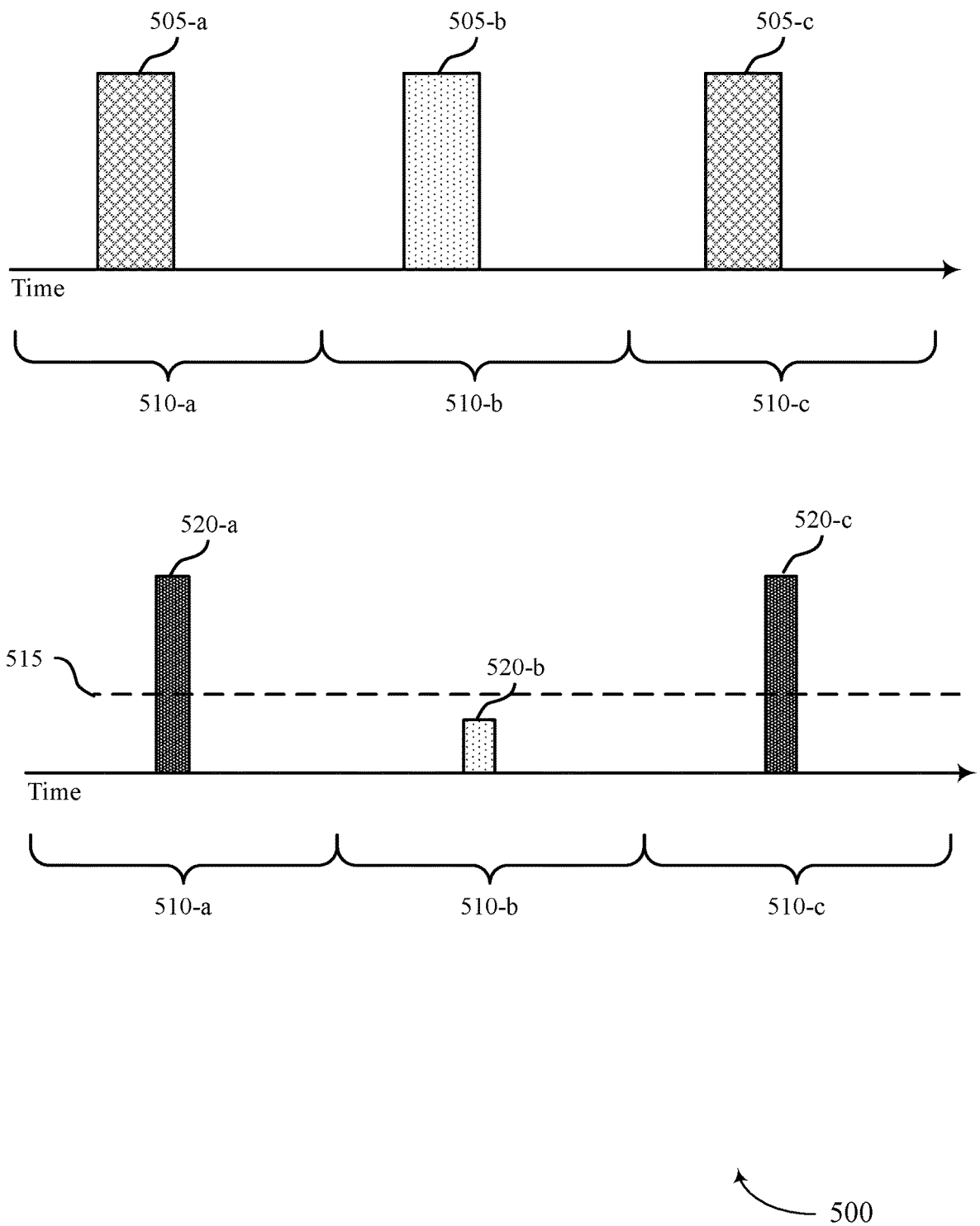
FIG. 5 illustrates an example of a timeline that supports handling of absence of interference for CLI measurement in accordance with aspects of the present disclosure.

FIG. 5 illustrates an example of a timeline 500 that supports handling of absence of interference for CLI measurement in accordance with aspects of the present disclosure. In some examples, timeline 500 may implement aspects of wireless communications systems 100 and 200. In some examples, a UE 115 may implement aspects of timeline 500. Such a UE 115 may be an example of corresponding devices described with reference to FIGS. 1-4.

In some examples, as described with reference to FIGS. 3-4, a victim UE 115 may perform one or more CLI measurements during CLI measurement occasions 505 (e.g., CLI measurement occasion 505-a, CLI measurement occasion 505-b, and CLI measurement occasion 505-c). In some examples, as described with reference to FIG. 4, an aggressor UE 115 may be unable to transmit uplink signals during some time periods. For instance, an aggressor UE 115 may be able send uplink transmissions during time period 510-a, and during time period 510-c. However, during time period 510-b, the aggressor UE 115 may be in an off mode of a DRX cycle, or may be unable to gain access to an unlicensed spectrum, or may be otherwise unable to send uplink transmissions. In such examples, the victim UE 115 may not detect any uplink signaling from the aggressor UE 115 during time period 510-b.

To avoid inaccurate measurement of CLI, the victim UE 115 may identify CLI measurement occasions 505 in which the aggressor UE 115 does not send any uplink transmissions. In some examples, the victim UE 115 may identify such empty CLI measurement occasions 505 based on a threshold CLI measurement value 515. The victim UE 115 may identify the threshold CLI measurement value based on a preconfiguration, or base station 105 may signal the threshold CLI measurement value to one or more victim UEs 115. If a physical layer measurement (e.g., a CLI measurement 520) satisfies (e.g., exceeds, or is equal to or exceeds) threshold CLI measurement value 515, then the victim UE 115 may use the CLI measurement 520 and may apply the filter to obtain an updated filtered CLI measurement value. However, if a CLI measurement 520 does not satisfy (e.g., is less than, or less than or equal to) threshold CLI measurement value 515, then the victim UE may discard the CLI measurement 520 (e.g., the resulting value of performing the CLI measurement 520).

For instance, the victim UE 115 may perform CLI measurement 520-a during CLI measurement occasion 505-a. CLI measurement 520-a may satisfy threshold CLI measurement value 515. The victim UE may apply the filter, as described with reference to FIG. 3. In some examples, where CLI measurement 520-a is a first CLI measurement 520, the victim UE 115 may set the value of $F_n$ to $F_0$. During CLI measurement occasion 505-b, the victim UE 115 may perform CLI measurement 520-b. CLI measurement 520-b may not satisfy threshold CLI measurement value 515. Thus, the victim UE 115 may discard CLI measurement 520-b. That is, the victim UE 115 may not apply the filter to CLI measurement 520-b, and may refrain from updating the filtered CLI measurement value. During CLI measurement occasion 505-c, the victim UE 115 may perform CLI measurement 520-c, which may satisfy threshold CLI measurement value 515. The victim UE 115 may thus only update the filter based on actual CLI measurements where uplink signaling is being transmitted by an aggressor UE 115.

A victim UE 115 may also adjust a filter coefficient (e.g., a as described with reference to FIG. 3) to account for discarded CLI measurements 520. For instance, having discarded some CLI measurements 520, a filtered CLI measurement value may be weighted to older measurements. Thus, to address this issue, the victim UE 115 may adapt a filter coefficient such that the time characteristics of the filter are preserved when some physical layer CLI measurements are discarded. That is, a value for the filter coefficient may be related to an amount of elapsed time since the last CLI measurement 520 that satisfied threshold CLI measurement value 515. The more CLI measurements 520 that the victim UE 115 has discarded, or the longer the elapsed time since the last CLI measurement 520 that satisfied threshold CLI measurement value 515, the larger value the victim UE 115 may select for the filter coefficient. That is, the victim UE 115 may discard CLI measurements 520 that do not satisfy threshold CLI measurement value 515, and when a CLI measurement 520 does satisfy threshold CLI measurement value 515, the victim UE 115 may increase the value for the filter coefficient such that the filtered CLI measurement value depends more on later CLI measurements 520 (e.g., to which a higher filter coefficient was applied) than on previous, or stale, CLI measurements 520.

Figure 6:
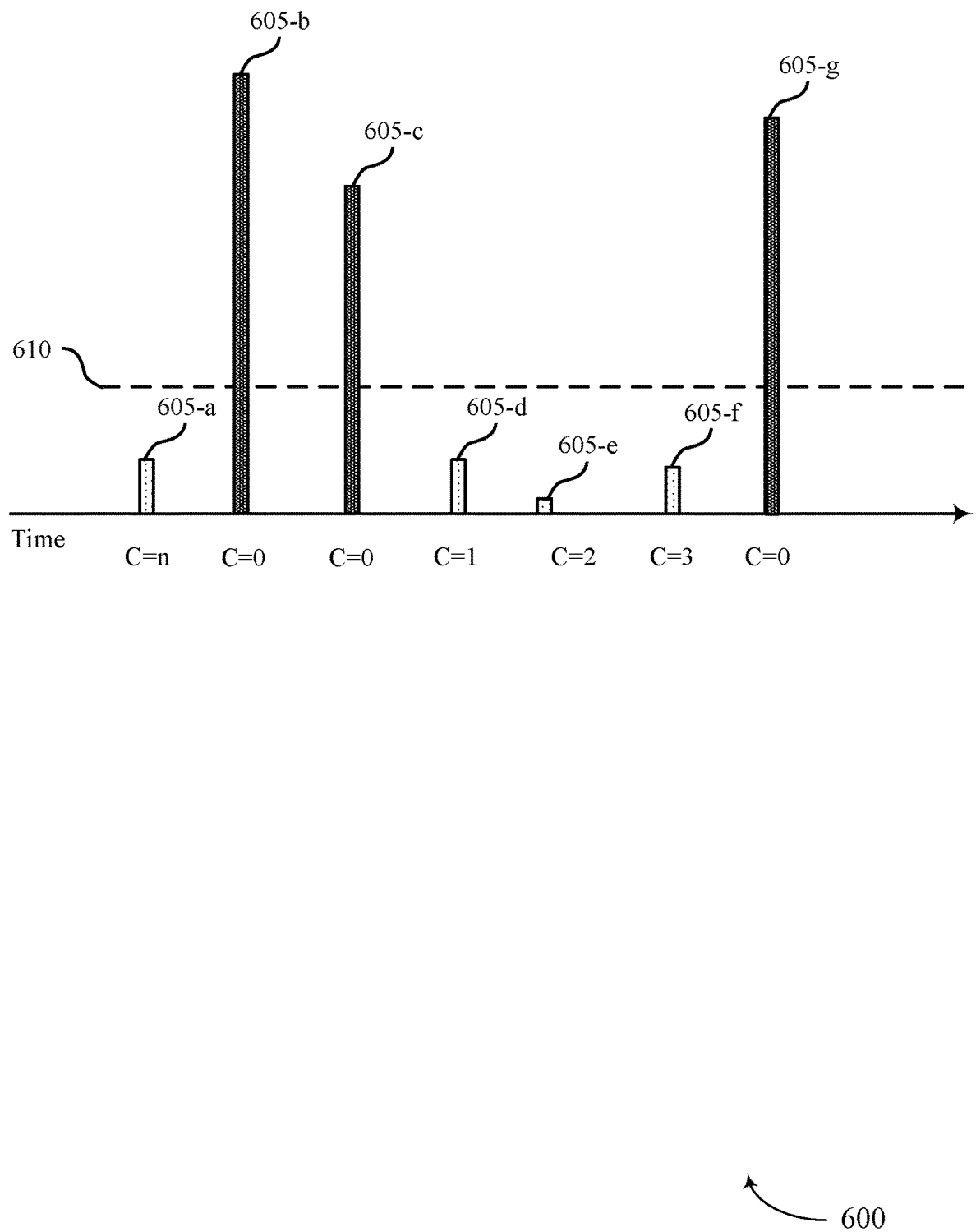
FIG. 6 illustrates an example of a timeline that supports handling of absence of interference for CLI measurement in accordance with aspects of the present disclosure.

FIG. 6 illustrates an example of a timeline 600 that supports handling of absence of interference for CLI measurement in accordance with aspects of the present disclosure. In some examples, timeline 600 may implement aspects of wireless communications systems 100 and 200. In some examples, a UE 115 may implement aspects of timeline 600. Such a UE 115 may be an example of corresponding devices described with reference to FIGS. 1-5.

As described with reference to FIGS. 3-5, a victim UE 115 may perform CLI measurements 605 during one or more CLI measurement occasions. The victim UE 115 may also determine a threshold CLI measurement value 610, and may discard CLI measurements 605 that do not satisfy threshold CLI measurement value 610.

In some examples, the victim UE 115 may increment a counter for each consecutive CLI measurement 605 that does not satisfy threshold CLI measurement value 610 since a previous CLI measurement 605 that does satisfy threshold CLI measurement value 610. A victim UE 115 may perform a CLI measurement 605, and may then increment or reset the counter, as described herein with reference to FIG. 6.

For example, the victim UE 115 may perform CLI measurement 605-a, which may not satisfy threshold CLI measurement value 610. The counter value may be set to n based on n−1 consecutive CLI measurements 605 that do not satisfy threshold CLI measurement value 610.

During a subsequent CLI measurement occasion, the victim UE 115 may perform CLI measurement 605-b, which may satisfy threshold CLI measurement value 610. The victim UE 115 may reset the counter to C=0. During a next CLI measurement occasion, the victim UE 115 may perform CLI measurement 605-c, which may also satisfy threshold CLI measurement value 610. Because CLI measurement 605-c satisfies threshold CLI measurement value 610, the victim UE 115 may refrain from incrementing the counter.

The victim UE 115 may perform CLI measurement 605-d, which does not satisfy threshold CLI measurement value 610. The victim UE 115 may increment the counter such that the counter value C=1. Upon performing CLI measurement 605-e which does not satisfy threshold CLI measurement value 610, the victim UE 115 may increment the counter such that the counter value C=2. When the victim UE 115 performs CLI measurement 605-f, which does not satisfy threshold CLI measurement value 610, UE 115 may further increment the counter such that the counter value C=3. The victim UE 615 may discard each of CLI measurements 605-d, 605-e, and 605-f (e.g., may not update the filtered CLI measurement value). The victim UE 115 may perform CLI measurement 605-g, which does satisfy threshold CLI measurement value 610. Upon determining that the CLI measurement 605-g does satisfy threshold CLI measurement value 610, the victim UE 115 may reset the counter such that the counter value C=0. The victim UE 115 may adjust the value of the filter coefficient based on the amount of time since CLI measurement 605-c, or a number of CLI measurements 605 that do not satisfy threshold CLI measurement value 610 since CLI measurement 605-c (e.g., three CLI measurements 605) such that the filtered CLI measurement value depends more on current CLI measurement 605-g than outdated or stale CLI measurement 605-c and measurements before 605-c.

In some examples, the victim UE 115 may determine a limit for the counter value. When the counter value exceeds the limit, the victim UE 115 may set a CLI measurement value result or an updated filtered CLI measurement value equal to a predefined value indicating no detected CLI (e.g., for a period of time). In some cases, the victim UE 115 may transmit a CLI measurement report with the predefined value. The limit may act as a forgetting factor. That is, at a next CLI measurement 605 that does satisfy threshold CLI measurement value 610 after the counter reaches the limit, the victim UE 115 may set the filter coefficient equal to one to reset the filter output to the current CLI measurement 605.

For instance, the limit may be equal to two. In such examples, the victim UE 115 may perform CLI measurement 605-c, which satisfies threshold CLI measurement value 610. Upon performing CLI measurement 605-d, which does not satisfy threshold CLI measurement value 610, the victim UE 115 may increment the counter such that the counter value C=1. After performing consecutive CLI measurement 605-e, which also does not satisfy threshold CLI measurement value 610, the victim UE 115 may increment the counter again such that the counter value C=2. If the victim UE 115 is configured to transmit a CLI measurement report prior to CLI measurement 605-g (e.g., in an aperiodic report or in a periodic report scheduled between CLI measurement 605-e and 605-g), the victim UE 115 may include the predefined value indicative of a lack of measured CLI. Upon receiving the CLI measurement report, a base station 105 may determine, based on the predetermined value, that during a time period (e.g., during the two CLI measurement occasions during which CLI measurement 605-d and CLI measurement 605-e were performed), no CLI was detected by victim UE 115. In some examples, the victim UE 115 may continue to increment the counter until a next CLI measurement that does satisfy threshold CLI measurement value 610 (e.g., CLI measurement 605-g). In some examples, the victim UE 115 may reset the counter each time the limit is reached. In either case, upon performing a next CLI measurement 605 that does satisfy threshold CLI measurement value 610 (e.g., 605-g), the victim UE 115 may reset the counter such that C=0, and may set the filter coefficient equal to one. That is, the victim UE 115 may discard CLI measurements 605-d, 605-e, and 605-f, and may not filter them. The victim UE 115 may filter CLI measurement 605-g, and may update the filtered CLI measurement value using a coefficient value of one such that the filtered value is reset to output a filtered CLI measurement value equal to CLI measurement 605-g. Setting the filter coefficient equal to one when the limit is exceeded may avoid the use of stale data (e.g., CLI measurement 605-c and CLI measurement 605-b).

In some examples, the victim UE 115 may utilize multiple counters as described in greater detail with reference to FIG. 7.

Figure 7:
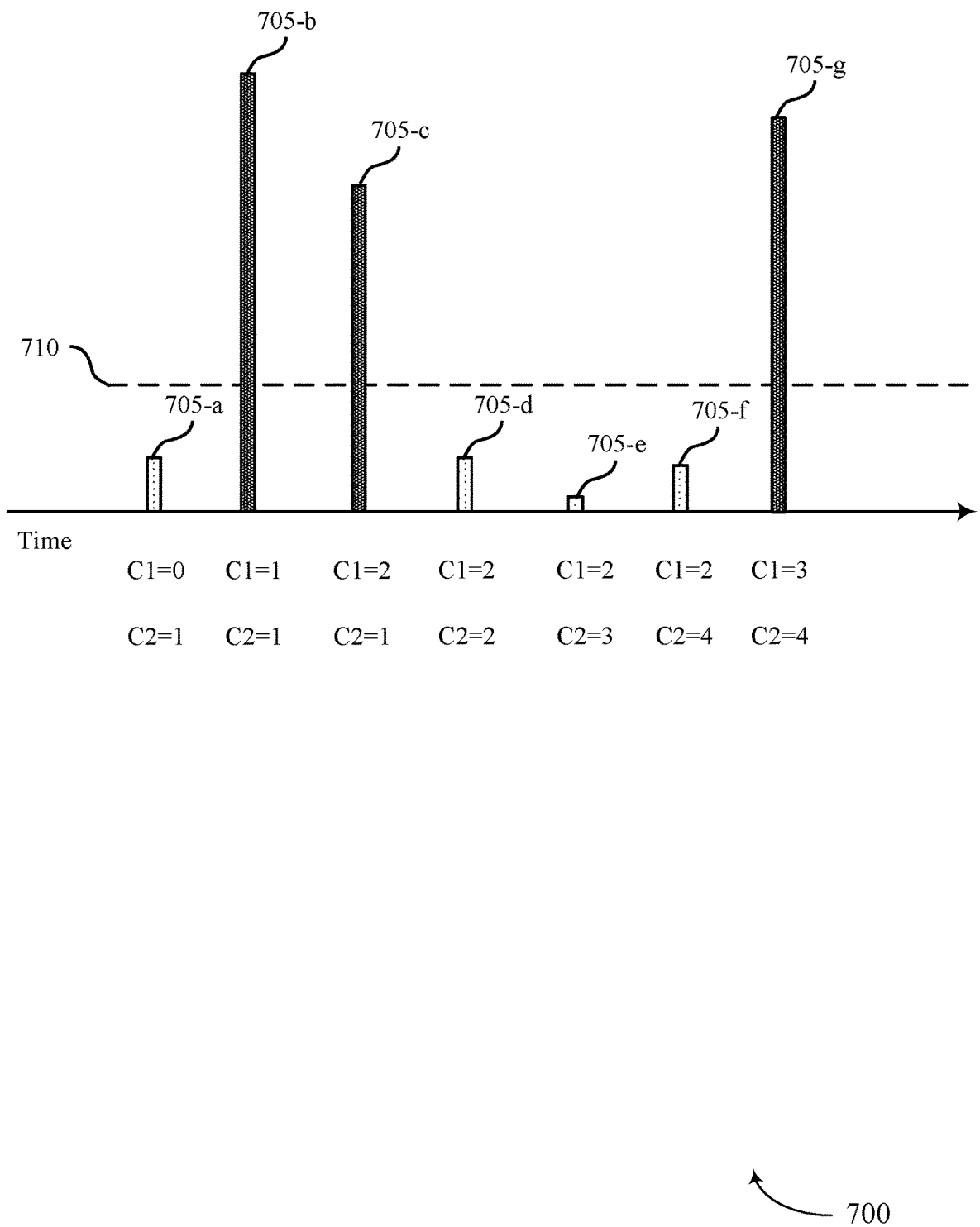
FIG. 7 illustrates an example of a timeline that supports handling of absence of interference for CLI measurement in accordance with aspects of the present disclosure.

FIG. 7 illustrates an example of a timeline 700 that supports handling of absence of interference for CLI measurement in accordance with aspects of the present disclosure. In some examples, timeline 700 may implement aspects of wireless communications systems 100 and 200. In some examples, a UE 115 and a base station 105 may implement aspects of timeline 600. Such a UE 115 and base stations 105 may be examples of corresponding devices described with reference to FIGS. 1-6.

As described with reference to FIGS. 3-6, a victim UE 115 may perform CLI measurements 705 during one or more CLI measurement occasions. The victim UE 115 may also determine a threshold CLI measurement value 710, and may discard CLI measurements 705 that do not satisfy threshold CLI measurement value 710.

In some examples, the victim UE 115 may increment a first counter for each CLI measurement 705 that does satisfy threshold CLI measurement value 710 and a second counter for each CLI measurement 705 that does not satisfy threshold CLI measurement value 710. A victim UE 115 may perform a CLI measurement 705, and may then increment or reset the counter, as described herein with reference to FIG. 7.

After each CLI measurement 705, the victim UE 115 may determine whether to increment each counter, based on whether the CLI measurement 705 satisfies threshold CLI measurement value 710. For instance, UE 115 may perform CLI measurement 705-*a*, which does not satisfy threshold CLI measurement value 710. The victim UE 115 may not increment the first counter C1 such that C1=0, and may increment the second counter C2 such that C2=1. The victim UE may perform CLI measurement 705-*b* which does satisfy threshold CLI measurement value 710. The victim UE 115 may increment the first counter C1 such that C2=1, but may refrain from incrementing the second counter C2 such that C1=1. Similarly, upon performing CLI measurement 705-*c* which does satisfy threshold CLI measurement value 710, the victim UE 115 may increment the first counter C1 such that C1=2, but may not increment the second counter C2 such that C2=1.

The victim UE 115 may perform CLI measurements 705-*d*, 705-*e*, and 705-*f*, which do not satisfy threshold CLI measurement value 710. In each case, the victim UE 115 may increment the second counter C2 such that, after CLI measurement 705-*f*, C2=4. The victim UE 115 may not increment the first counter C1 such that, after CLI measurement 705-*f*, C1=2. Upon performing CLI measurement 705-*g*, the victim UE 115 may increment the first counter such that C1=3, and may not increment the second counter C2 such that C2=4. Thus, after a number (e.g., seven) of CLI measurement occasions, victim UE 115 may have increment two counters such that a first counter value (e.g., C1) is equal to three (e.g., C1=3) and a second counter value (e.g., C2) is equal to four (e.g., C2=4). The counter values may reflect how often a physical measurement result is above threshold CLI measurement value 710. In some examples, the counter values may be incremented only for consecutive CLI measurements associated with a particular counter (e.g., consecutive CLI measurements 705 that do satisfy threshold CLI measurement value 710, or consecutive CLI measurements 704 that do not satisfy threshold CLI measurement value 710). In some examples, the victim UE 115 may increment each counter for any CLI measurement 705 associated with the counter within a period of time (e.g., the victim UE 115 may increment the second counter such that C2=1 for CLI measurement 705-*a*, and may then increment the second counter again for CLI measurement 705-*d*, despite the fact that CLI measurement 705-*a* and CLI measurement 705-*d* are not consecutive).

In some examples, the victim UE 115 may include, in a CLI measurement report, information associated with the first counter, the second counter, or both. For instance, the CLI measurement report may include a first counter value (e.g., C1=3), a second counter value (e.g., C2=4), or both. The CLI measurement report may include a relationship between the two counters, such as a ratio $$\left(\text{e.g., } \frac{C1}{C2}, \text{ or } \frac{C2}{C1}\right).$$

In some examples, me CLI measurement report may include a relationship between the two counters, such as a duty cycle for CLI measurements that are above the threshold and not above the threshold among all measurements, respectively. Such a relationship may be indicated as a first counter value or a second counter value divided by the sum of the first counter value and the second counter value $$\left(\text{e.g., } \frac{C1}{C1+C2} \text{ or } \frac{C2}{C1+C2}\right).$$

The victim UE 115 may determine a criteria or rule for triggering CLI measurement reports. For instance, a rule may provide that UE 115 is not to transmit a CLI measurement report unless one or more conditions are satisfied. For instance, the victim UE 115 may refrain from transmitting a CLI measurement report unless a relationship value between the first counter and the second counter $$\left(\text{e.g., } \frac{C1}{C2}, \frac{C2}{C1}, \frac{C1}{C1+C2} \text{ or } \frac{C2}{C1+C2}\right)$$

satisfies a threshold relationship value. That is, a CLI report may be triggered by one or more conditions, autonomously prepared or requested by the victim UE 115, or scheduled (e.g., via higher layer signaling) by a base station 105 (e.g., a period CLI measurement report). The victim UE 115 may determine whether a relationship value satisfies a relationship value threshold. If it does not, then the victim UE 115 may refrain from transmitting the CLI measurement report (e.g., may refrain from transmitting a scheduled and pending CLI measurement report, or may refrain from requesting resources for a CLI measurement report, or may refrain from initiating the CLI measurement report, or the like).

In some examples, after transmitting a CLI measurement report (e.g., including information related to the first counter and the second counter, or a relationship between the first counter and the second counter), the victim UE 115 may reset both counters such that C1=0 and C2=0 for a next CLI measurement 705.

Figure 8:
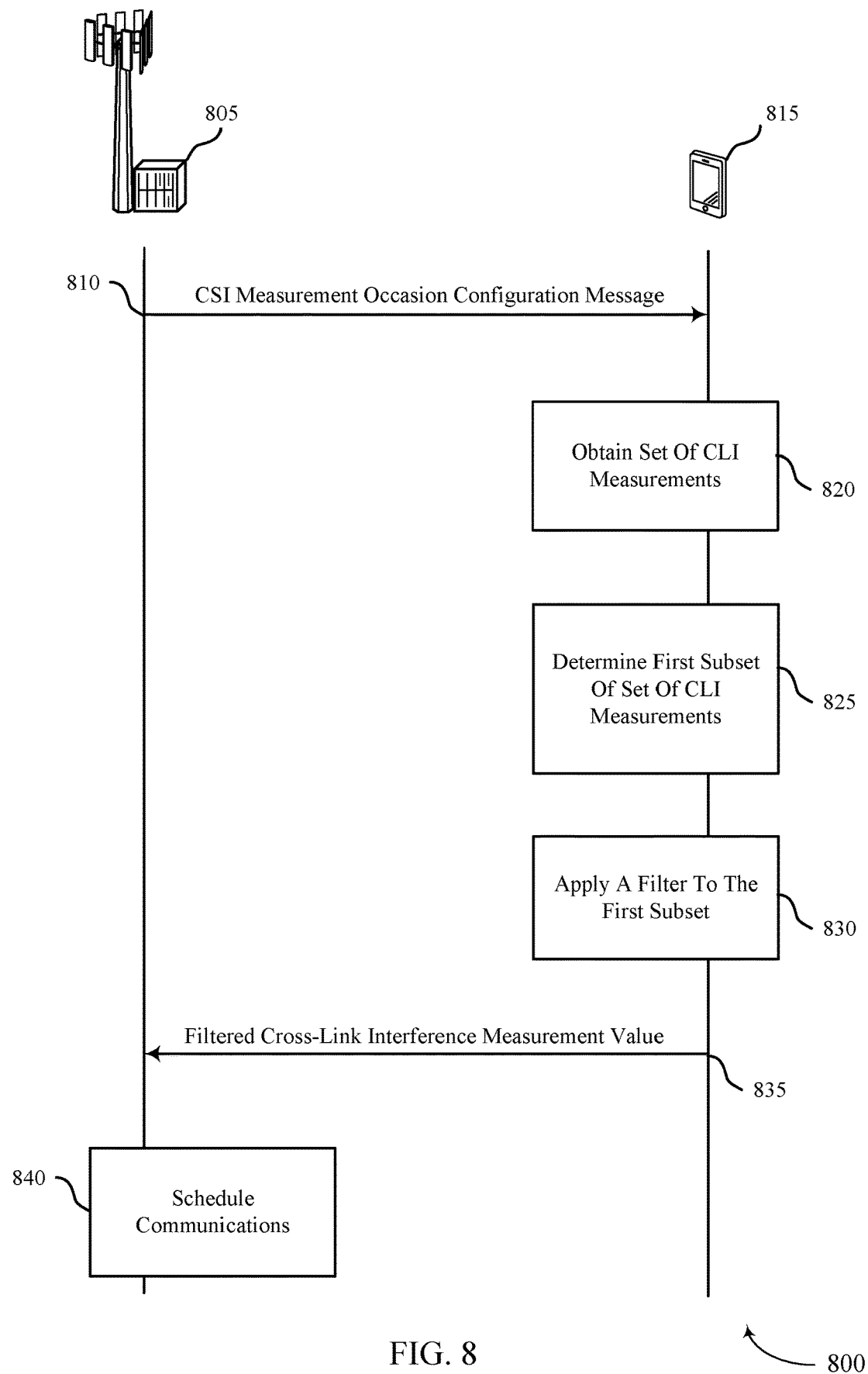
FIG. 8 illustrates an example of a process flow that supports handling of absence of interference for CLI measurement in accordance with aspects of the present disclosure.

FIG. 8 illustrates an example of a process flow 800 that supports handling of absence of interference for CLI measurement in accordance with aspects of the present disclosure. The process flow 800 may be implemented by a base station 805 and a UE 815, which may be examples of corresponding devices as described with reference to FIGS. 1-7. UE 815 may be an example of a victim UE 115 that experiences CLI generated by one or more aggressor UEs 115.

At 810, UE 815 may receive, from base station 805, a CSI measurement opportunity configuration message via higher layer signaling (e.g., RRC signaling). The CSI measurement opportunity configuration message may indicate time, frequency, or spatial resources for performing CLI measurements.

At 820, UE 815 may obtain a set of CLI measurements by performing CLI measurement procedures during the indicated CLI measurement occasions).

At 825, UE 815 may determine a first subset of the set of CLI measurements that satisfy a CLI measurement threshold. In some examples, UE 815 may also determine a second subset of the set of CLI measurements that do not satisfy the CLI measurement threshold. UE 815 may discard CLI measurements that do not satisfy the CLI measurement threshold. That is, UE 815 may suppress the filter for the second subset of the set of CLI measurements, and the filtered CLI measurement value is based on suppressing the filter for the second subset of the CLI measurements. In some examples, UE 815 may adjust a coefficient value for a current CLI measurement of the first subset of the set of CLI measurements based on a number of CLI measurements in the second subset of the set of CLI measurements.

In some examples, UE 815 may perform a first CLI measurement, and may initiate a counter based on the first CLI measurement is in the first subset of the set of CLI measurements. UE 815 may perform one or more additional CLI measurements, and increment the counter for each of the additional CLI measurements based at least in part on determining that the one or more additional CLI measurements are in the second subset of the set of CLI measurements. In some examples, UE 815 may perform a second CLI measurement subsequent to the one or more additional CLI measurements, and may rest the counter based on determining that the second CLI measurement is in the first subset of the set of CLI measurements. UE 815 may adjust a coefficient value for the second CLI measurement of the first subset of the set of CLI measurements based on the last value of the counter prior to resetting the counter.

At 830, UE 815 may apply a filter to the first subset of the set of CLI measurements to obtain a filtered CLI measurement value.

At 835, UE 815 may transmit the filtered CLI measurement value to base station 805. UE 815 may determine, based on incrementing the counter, that an incremented counter value satisfies a counter threshold, and may generate a CLI measurement value indicating a lack of detected CLI interference. In such cases, UE 815 may then transmit the CLI measurement value to base station 805. A CLI measurement report may include the CLI measurement value. After transmitting the CLI measurement report, the UE 815 may perform another CLI measurement, and may set a coefficient value equal to one for the current CLI measurement, and may apply the filter to the first subset of the set of CLI measurements based on the coefficient value.

In some examples, upon determining the first subset of the set of CLI measurements and the second subset of the set of CLI measurements, UE 815 may initiate and increment a first counter for each CLI measurement of the first subset of the set of CLI measurements and may initiate and increment a second counter for each CLI measurement of the second subset of the set of CLI measurements. In such examples, transmitting the CLI measurement report may include a first counter value for the first counter, or a second counter value for the second counter, both, a ratio between the first counter value and the second counter value, or another relationship between the first counter value and the second counter value (e.g., the first counter value or the second counter value divided by the sum of the first counter value and the second counter value).

At 840, base station 805 may schedule communications from UE 815 and other UEs based on the CLI measurement value. In some cases, the CLI measurement value may be included in a CLI measurement report. Base station 805 may perform the scheduling based on the first counter value, the second counter value, or the relationship between the first and second counter value.

If base station 105 receives an indication that no CLI measurement has been received, then base station 105 may adjust or schedule communications accordingly (e.g., may not change a current resource configuration because no CLI is reported). In some examples (e.g., where UE 815 refrains from transmitting a CLI report because a relationship between the first counter value and the second counter value does not satisfy a counter value relationship threshold), Base station 805 may determine that the counter value relationship threshold is not satisfied because it does not receive a CLI report, and may thus configure communications or refrain from configuring such communications based on the determining.

Figure 9:
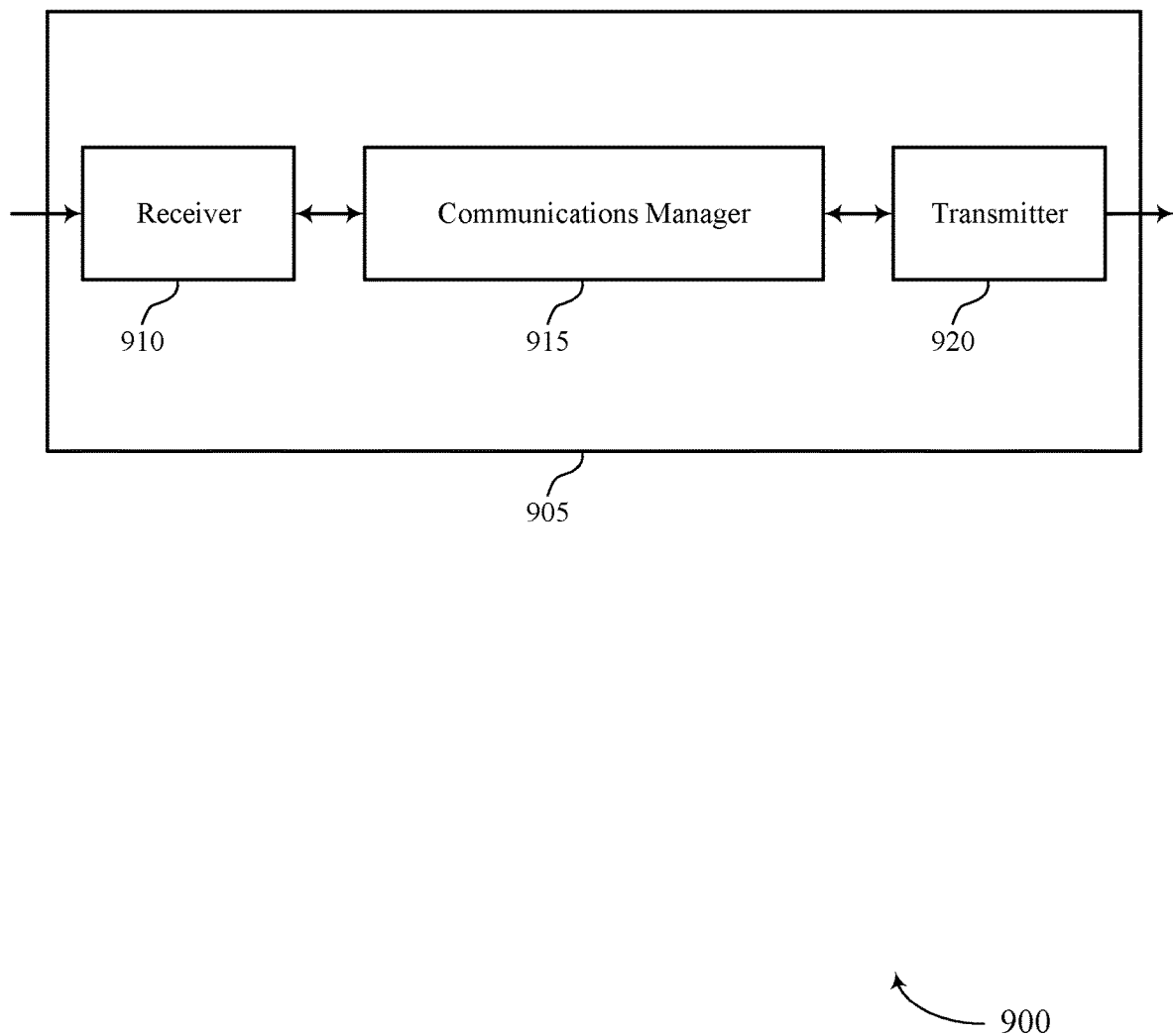
FIGS. 9 and 10 show block diagrams of devices that support handling of absence of interference for CLI measurement in accordance with aspects of the present disclosure.

FIG. 9 shows a block diagram 900 of a device 905 that supports handling of absence of interference for CLI measurement in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to handling of absence of interference for CLI measurement, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may obtain a set of CLI measurements based on a corresponding set of CLI measurement occasions, transmit the filtered CLI measurement value to a base station, determine a first subset of the set of CLI measurements that satisfy a CLI measurement threshold, and apply a filter to the first subset of the set of CLI measurements to obtain a filtered CLI measurement value. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
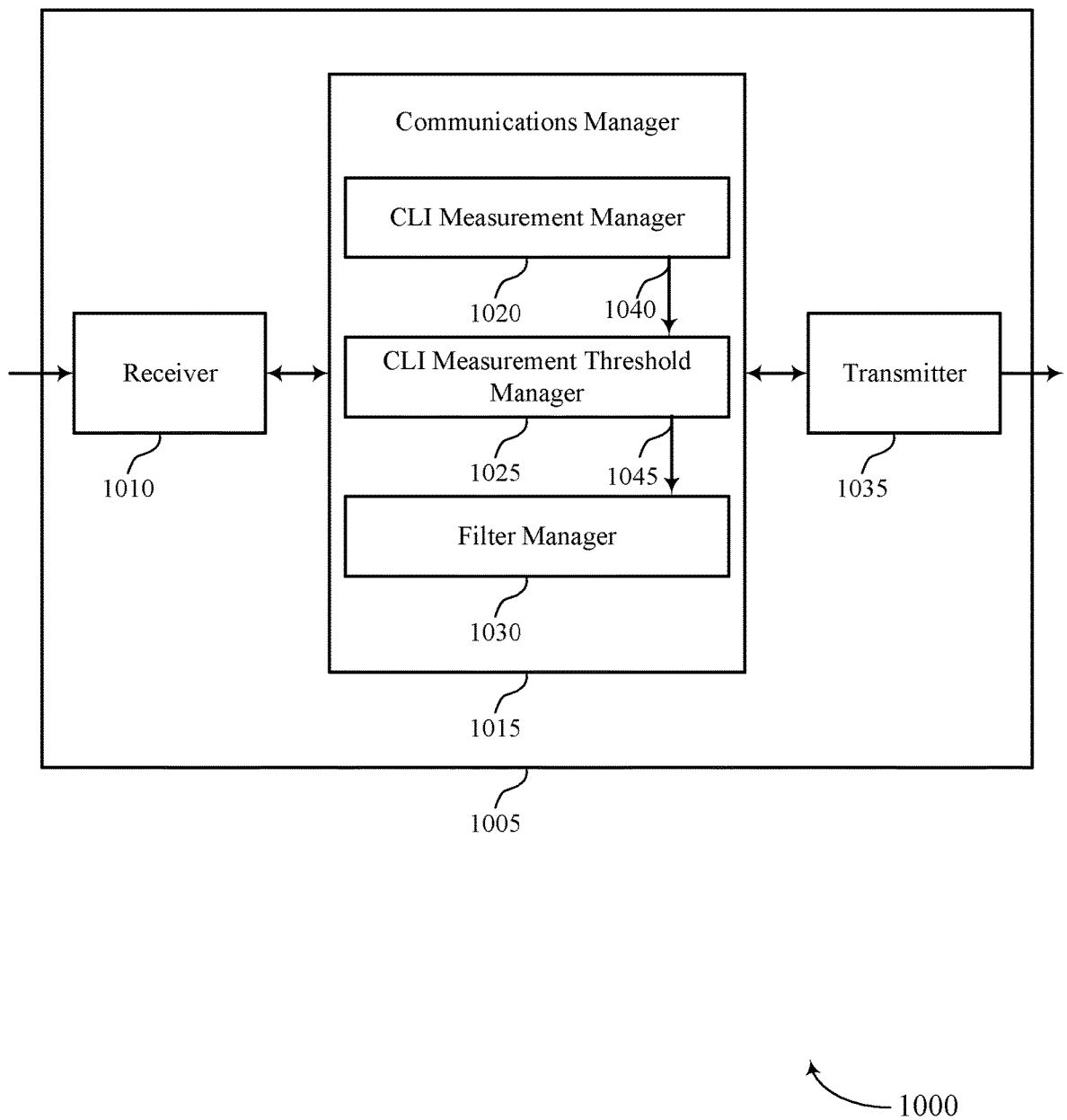

FIG. 10 shows a block diagram 1000 of a device 1005 that supports handling of absence of interference for CLI measurement in accordance with aspects of the present disclosure. The device 1005 may be an example of aspects of a device 905, or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to handling of absence of interference for CLI measurement, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a CLI measurement manager 1020, a CLI measurement threshold manager 1025, and a filter manager 1030. The communications manager 1015 may be an example of aspects of the communications manager 1210 described herein.

The CLI measurement manager 1020 may obtain a set of CLI measurements based on a corresponding set of CLI measurement occasions and transmit the filtered CLI measurement value to a base station. The CLI measurement manager 1020 may send a CLI measurement signal to CLI measurement threshold manager 1025.

The CLI measurement threshold manager 1025 may determine a first subset of the set of CLI measurements that satisfy a CLI measurement threshold. The CLI measurement threshold manager 1025 may send a CLI measurement threshold signal to filter manager 1030.

The filter manager 1030 may apply a filter to the first subset of the set of CLI measurements to obtain a filtered CLI measurement value.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
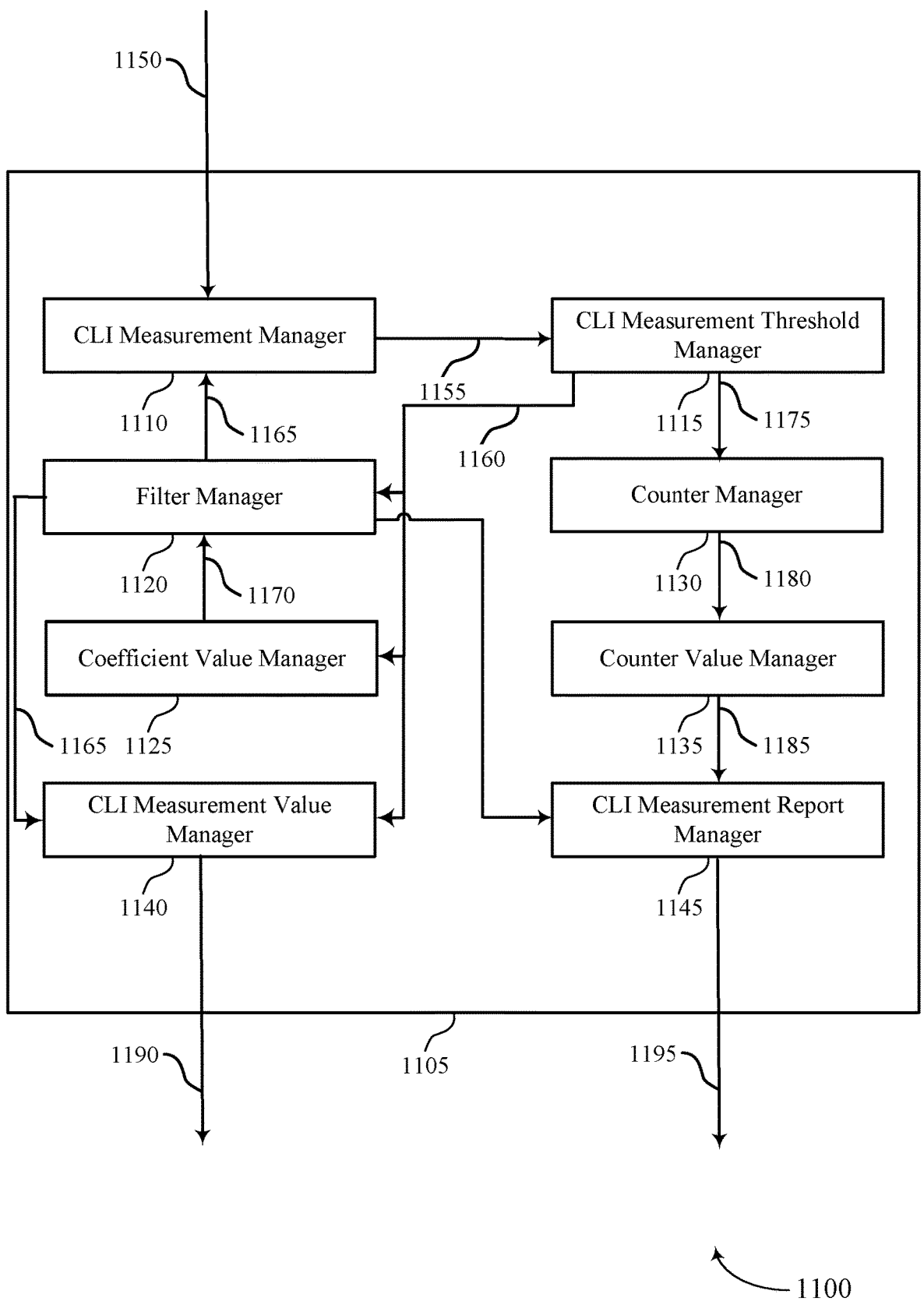
FIG. 11 shows a block diagram of a communications manager that supports handling of absence of interference for CLI measurement in accordance with aspects of the present disclosure.

FIG. 11 shows a block diagram 1100 of a communications manager 1105 that supports handling of absence of interference for CLI measurement in accordance with aspects of the present disclosure. The communications manager 1105 may be an example of aspects of a communications manager 915, a communications manager 1015, or a communications manager 1210 described herein. The communications manager 1105 may include a CLI measurement manager 1110, a CLI measurement threshold manager 1115, a filter manager 1120, a coefficient value manager 1125, a counter manager 1130, a counter value manager 1135, a CLI measurement value manager 1140, and a CLI measurement report manager 1145. Each of these modules may communicate, directly or indirectly, with one another (e.g., via one or more buses).

The CLI measurement manager 1110 may obtain a set of CLI measurements based on a corresponding set of CLI measurement occasions. In some examples, the CLI measurement manager 1110 may transmit the filtered CLI measurement value to a base station. In some examples, the CLI measurement manager 1110 may perform a first CLI measurement. In some examples, CLIL measurement manager 110 may receive one or more reference signals 1150, on which to perform CLI measurements.

In some examples, the CLI measurement manager 1110 may perform one or more additional CLI measurements. In some examples, the CLI measurement manager 1110 may perform a second CLI measurement subsequent to the one or more additional CLI measurements. In some examples, the CLI measurement manager 1110 may send (e.g., via one or more buses) one or more CLI measurements to CLI measurement threshold manager 1115.

The CLI measurement threshold manager 1115 may determine a first subset of the set of CLI measurements that satisfy a CLI measurement threshold. In some examples, the CLI measurement threshold manager 1115 may determine a second subset of the set of CLI measurements that do not satisfy the CLI measurement threshold. The CLI measurement threshold manager 1110 may send (e.g., via one or more buses) an indication 1160 of the first subset, the second subset, or both, to the filter manager 1120.

The filter manager 1120 may apply a filter to the first subset of the set of CLI measurements to obtain a filtered CLI measurement value. In some examples, the filter manager 1120 may suppress the filter for the second subset of the set of CLI measurements, where the filtered CLI measurement value is based on suppressing the filter for the second subset of the set of CLI measurements. The filter manager 1120 may send (e.g., via one or more buses) an indication 1165 of the filtered CLI measurement value. In some examples, filter manager 1120 may send the indication 1165 to the CLI measurement value 1140.

The coefficient value manager 1125 may adjust a coefficient value for a current CLI measurement of the first subset of the set of CLI measurements based on a number of CLI measurements in the second subset of the set of CLI measurements. In some examples, the coefficient value manager 1125 may adjust a coefficient value for the second CLI measurement of the first subset of the set of CLI measurements based on a last value of the counter prior to resetting the counter. In some examples, the coefficient value manager 1125 may set a coefficient value equal to one for the second CLI measurement based on determining that the incremented counter value satisfies the counter threshold, where applying the filter to the first subset of the set of CLI measurements is based on the coefficient value. In some examples, the coefficient value manager 1125 may receive an indication 1160 of the first subset of the set of CLI measurements or the second subset of the set of CLI measurements, or both, from the CLI measurement threshold manager 1115. The Coefficient value manager may send an indication 1170 of the filter manager 1120.

The counter manager 1130 may initiate a counter based on determining the first CLI measurement is in the first subset of the set of CLI measurements. In some examples, the counter manager 1130 may increment the counter for each of the one or more additional CLI measurements based on determining that the one or more additional CLI measurements are in the second subset of the set of CLI measurements. In some examples, the counter manager 1130 may reset the counter based on determining that the second CLI measurement is in the first subset of the set of CLI measurements.

In some examples, the counter manager 1130 may increment a first counter for each CLI measurement of the first subset of the set of CLI measurements to obtain a first counter value. In some examples, the counter manager 1130 may increment a second counter for each CLI measurement of the second subset of the set of CLI measurements to obtain a second counter value. In some examples, the counter manager 1130 may determine that a first ratio between the first counter value and the second counter value or a second ratio between the first counter value and a sum of the first counter value and the second counter value, or a third ratio between the second counter value and a sum of the first counter value and the second counter value satisfies a threshold value, where transmitting the filtered CLI measurement value is based on determining that the first ratio or the second ratio satisfies the threshold value. In some examples, the counter manager 1130 may reset, based on transmitting the filtered CLI measurement value to the base station, the first counter and the second counter. The counter manager 1130 may receive (e.g., via one or more buses) from CLI measurement threshold manager 1175, an indication of the first subset of the set of CLI measurements, the second subset of the set of CLI measurements, or both. In some examples, the counter manager 1130 may send (e.g., via one or more buses), to counter value manger 1135, an indication 1180 of the one or more counter values based on the first counter, the second counter, or both.

The counter value manager 1135 may determine, based on incrementing the counter, that an incremented counter value satisfies a counter threshold. The counter value manager 1135 may send (e.g., via one or more buses) a counter value signal 1185 to CLI measurement value manager 1140. The counter value signal 1185 may include an indication of one or more counter values for inclusion in the CLI measurement report manager. In some examples, the counter value manager 1135 may send (e.g., via one or more buses) the counter value signal 1185 to CLI measurement value manager 1140.

The CLI measurement value manager 1140 may generate, based on determining that the incremented counter value satisfies the counter threshold, a CLI measurement value indicating a lack of detected CLI. In some examples, the CLI measurement value manager 1140 may transmit the CLI measurement value 1190 to the base station.

The CLI measurement report manager 1145 may transmit a CLI measurement report including the filtered CLI measurement value and an indication of the first counter value, the second counter value, a ratio between the first counter value and the second counter value, a relationship between the first counter value and the second counter value, or any combination thereof. CLI measurement report manager 1145 may send a CLI measurement report 1195 to a manager (e.g., via one or more buses) or directly to a base station. In some examples, the CLI measurement report manager may receive (e.g., from filter manager 1170), an indication 1196 of the filtered CLI measurement values. CLI measurement report may in communication (e.g., via one or more buses) with one or more managers of device 1105, and may receive signaling (e.g., indications of the first counter value, the second counter value, a ratio between the first counter value and the second counter value, a relationship between the first counter value and the second counter value, or any combination thereof) from the other managers for inclusion in the CLI measurement report 1195.

Figure 12:
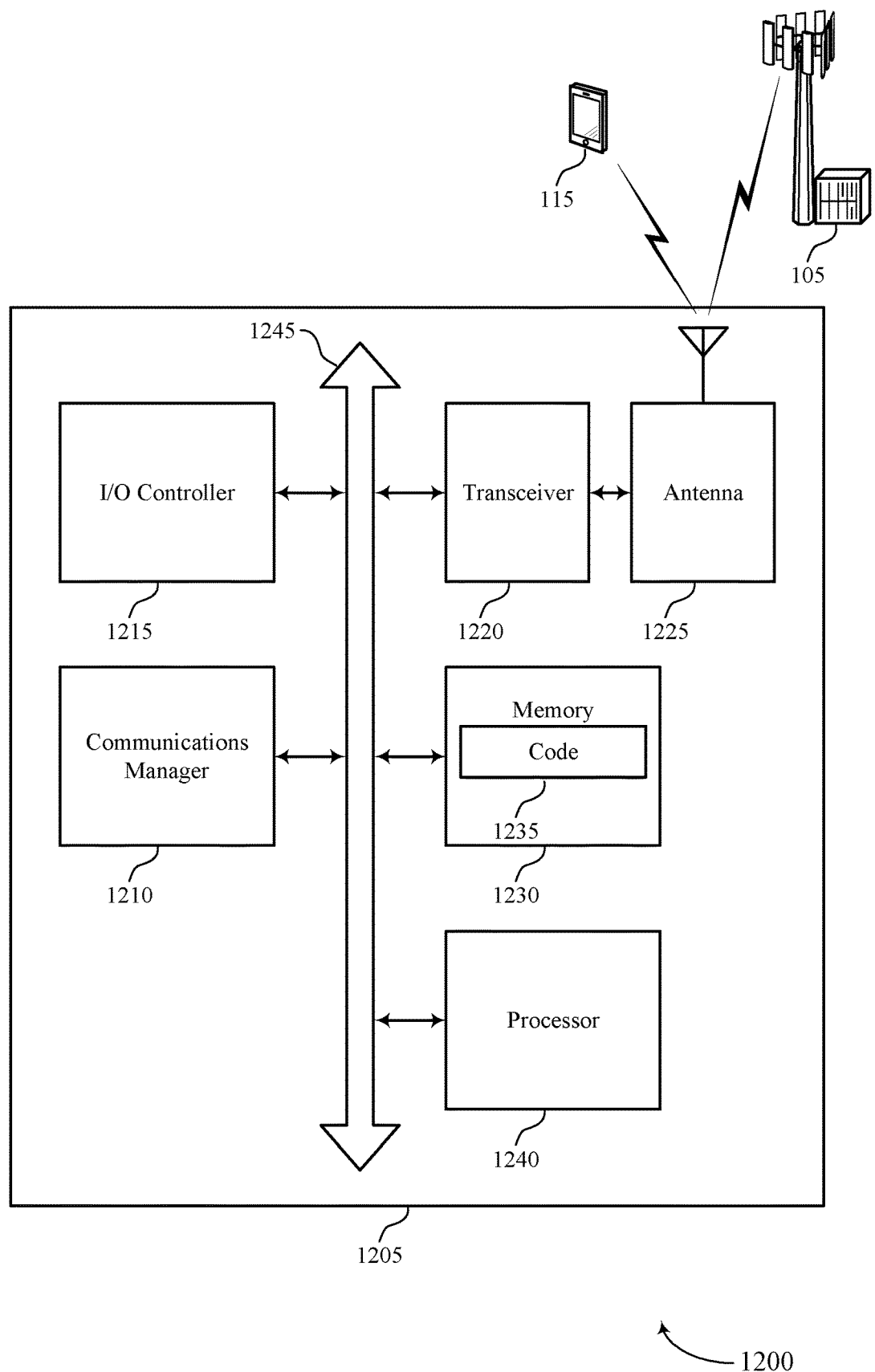
FIG. 12 shows a diagram of a system including a device that supports handling of absence of interference for CLI measurement in accordance with aspects of the present disclosure.

FIG. 12 shows a diagram of a system 1200 including a device 1205 that supports handling of absence of interference for CLI measurement in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may obtain a set of CLI measurements based on a corresponding set of CLI measurement occasions, transmit the filtered CLI measurement value to a base station, determine a first subset of the set of CLI measurements that satisfy a CLI measurement threshold, and apply a filter to the first subset of the set of CLI measurements to obtain a filtered CLI measurement value.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting handling of absence of interference for CLI measurement).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
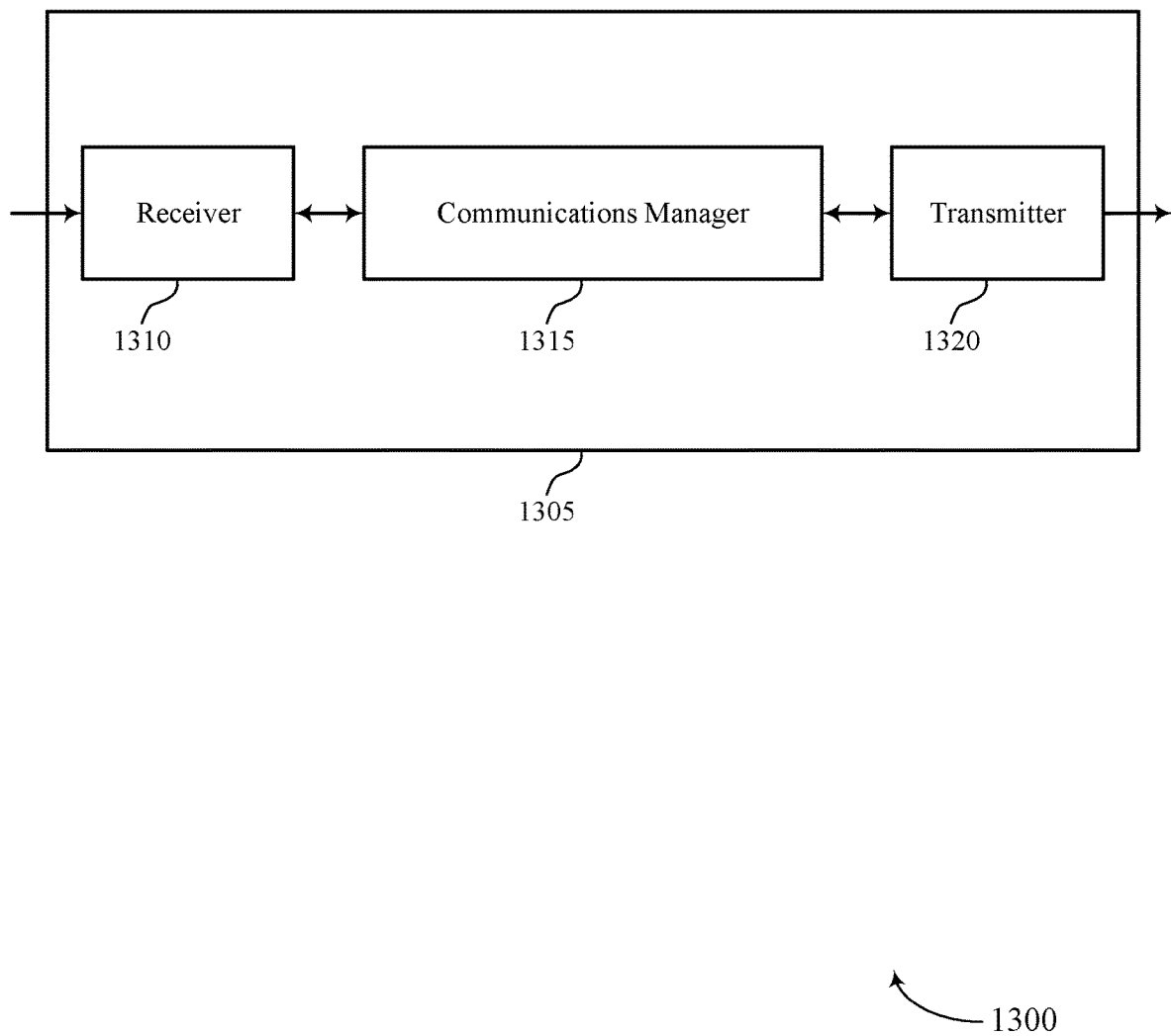
FIGS. 13 and 14 show block diagrams of devices that support handling of absence of interference for CLI measurement in accordance with aspects of the present disclosure.

FIG. 13 shows a block diagram 1300 of a device 1305 that supports handling of absence of interference for CLI measurement in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to handling of absence of interference for CLI measurement, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may configure, for a UE, a set of CLI measurement occasions for a set of CLI measurements, receive, from the UE based on configuring the set of CLI measurement occasions, a CLI measurement report including a filtered CLI measurement value corresponding to the set of CLI measurement occasions and an indication of at least a first counter value associated with a first subset of measurements associated with the set of CLI measurement occasions that satisfy a CLI measurement threshold or a second counter value associated with a second subset of measurements associated with the set of CLI measurement occasions that do not satisfy the CLI measurement threshold, and schedule communications for the UE and at least a second UE based on receiving the CLI measurement report. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
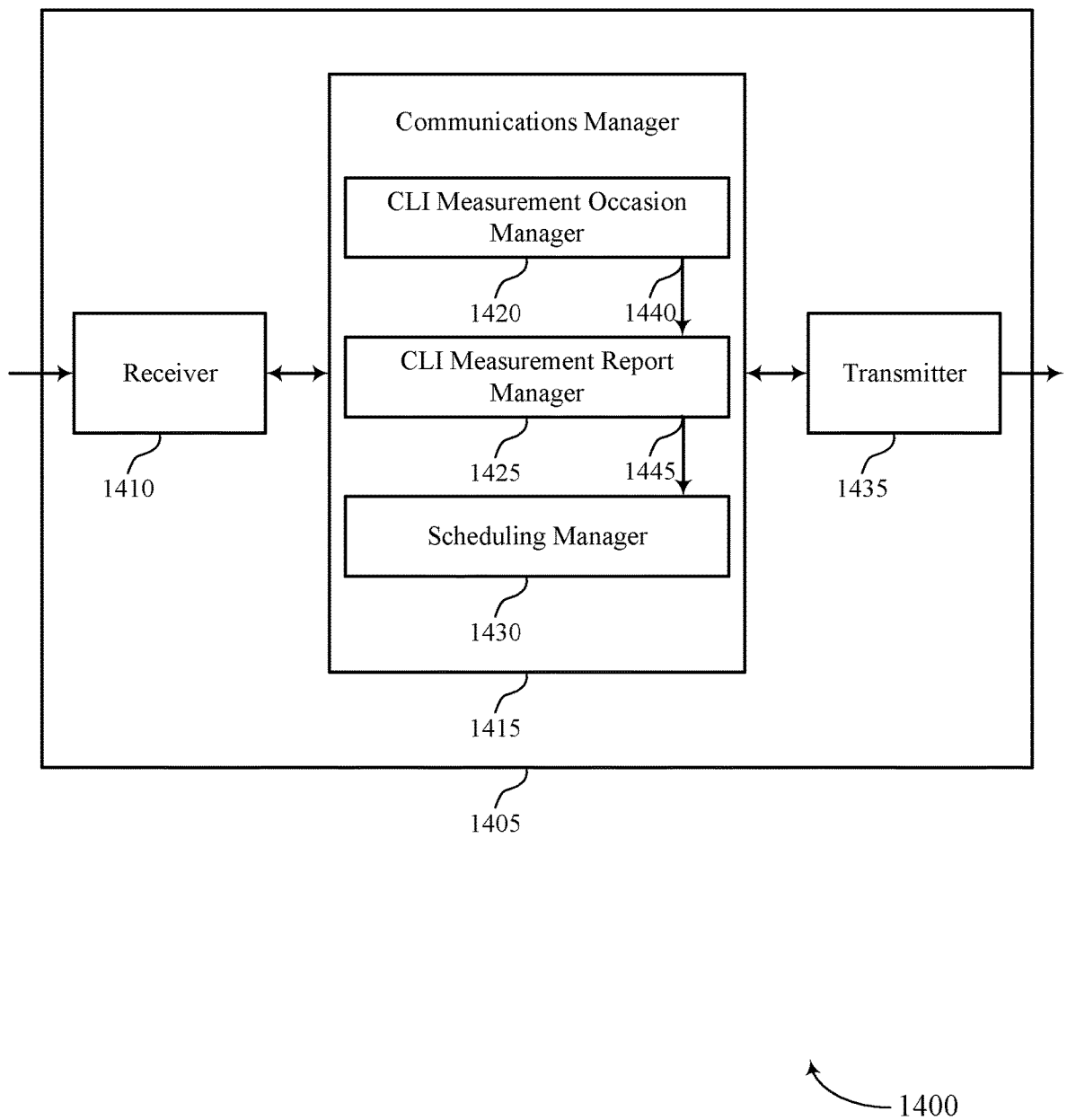

FIG. 14 shows a block diagram 1400 of a device 1405 that supports handling of absence of interference for CLI measurement in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to handling of absence of interference for CLI measurement, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a CLI measurement occasion manager 1420, a CLI measurement report manager 1425, and a scheduling manager 1430. The communications manager 1415 may be an example of aspects of the communications manager 1610 described herein.

The CLI measurement occasion manager 1420 may configure, for a UE, a set of CLI measurement occasions for a set of CLI measurements. The CLI measurement occasion manager 1420 may send a CLI measurement occasion signal 1140 to CLI measurement report manager 1425. The CLI measurement occasion signal 1140 may include an indication of a set of CLI measurement occasions.

The CLI measurement report manager 1425 may receive, from the UE based on configuring the set of CLI measurement occasions, a CLI measurement report including a filtered CLI measurement value corresponding to the set of CLI measurement occasions and an indication of at least a first counter value associated with a first subset of measurements associated with the set of CLI measurement occasions that satisfy a CLI measurement threshold or a second counter value associated with a second subset of measurements associated with the set of CLI measurement occasions that do not satisfy the CLI measurement threshold. The CLI measurement report manager 1425 may send, to the scheduling manager 1430, a CLI measurement report signal 1445. The CLI measurement report signal 1445 may include a CLI measurement report received from the UE.

The scheduling manager 1430 may schedule communications for the UE and at least a second UE based on receiving the CLI measurement report.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
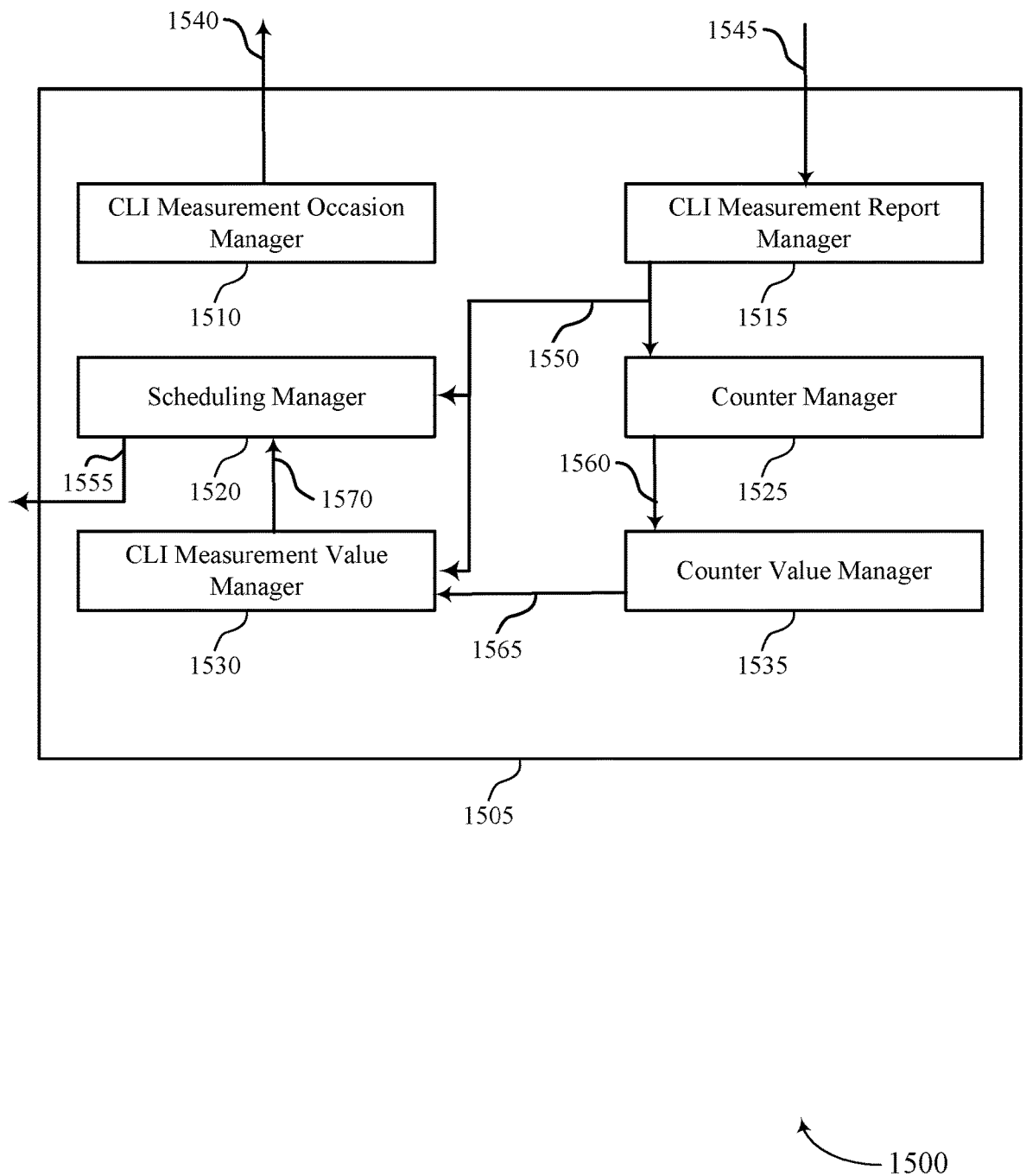
FIG. 15 shows a block diagram of a communications manager that supports handling of absence of interference for CLI measurement in accordance with aspects of the present disclosure.

FIG. 15 shows a block diagram 1500 of a communications manager 1505 that supports handling of absence of interference for CLI measurement in accordance with aspects of the present disclosure. The communications manager 1505 may be an example of aspects of a communications manager 1315, a communications manager 1415, or a communications manager 1610 described herein. The communications manager 1505 may include a CLI measurement occasion manager 1510, a CLI measurement report manager 1515, a scheduling manager 1520, a counter manager 1525, a CLI measurement value manager 1530, and a counter value manager 1535. Each of these modules may communicate, directly or indirectly, with one another (e.g., via one or more buses).

The CLI measurement occasion manager 1510 may configure, for a UE, a set of CLI measurement occasions for a set of CLI measurements. The CLI measurement occasion manager 1510 may send (e.g., directly or via higher layers at the device 1505) a CLI measurement occasion signal 1540 to the UE. The CLI measurement occasion signal 1540 may include an indication of the set of CLI measurement occasions for the set of CLI measurements for the UE.

The CLI measurement report manager 1515 may receive, from the UE based on configuring the set of CLI measurement occasions, a CLI measurement report 1545 including a filtered CLI measurement value corresponding to the set of CLI measurement occasions and an indication of at least a first counter value associated with a first subset of measurements associated with the set of CLI measurement occasions that satisfy a CLI measurement threshold or a second counter value associated with a second subset of measurements associated with the set of CLI measurement occasions that do not satisfy the CLI measurement threshold. In some examples, the CLI measurement report manager 1515 may send (e.g., via one or more buses) a CLI measurement report signal 1550 to scheduling manager 1520. In some examples, the CLI measurement report manager 1515 may send (e.g., via one or more buses) a CLI measurement report signal 1550 to CLI measurement value manager 1530, or counter manager 1525, or both.

The scheduling manager 1520 may schedule communications for the UE and at least a second UE based on receiving the CLI measurement report (e.g., from CLI measurement report manager 1515). The scheduling manager 1520 may send (e.g., via one or more buses) a scheduling signal 1555 to the UE and at least the second UE.

The counter manager 1525 may generate the indication of a relationship between the first counter value and the second counter value to include a first ratio between the first counter value and the second counter value, a second ratio between the first counter value and a sum of the first counter value and the second counter value, a third ratio between the second counter value and a sum of the first counter value and the second counter value, or a combination thereof. The counter manager 1525 may receive (e.g., via one or more buses) the CLI measurement report signal 1550. In some examples, the counter manager 1525 may generate the indication based at least in part on the CLI measurement report signal 1550. The counter manager 1525 may send (e.g., via one or more buses) a counter signal 1560 to counter value manager 1535.

The counter value manager 1535 may receive the CLI measurement report based on the second counter value satisfying a maximum counter value. The counter value manager 1535 may determine that the CLI measurement report based on the counter signal 1560 received from counter manager 1525. The counter value manager 1535 may send (e.g., via one or more buses), an indication 1565 of the CLI measurement report based on the counter value and the maximum counter value.

The CLI measurement value manager 1530 may generate the CLI measurement report including an indication of a lack of detected CLI during the set of CLI measurement occasions. The CLI measurement value manager may send (e.g., via one or more buses) a CLI measurement value signal 1570 to a scheduling manager 1520. The scheduling manager 1520 may generate scheduling information to send to the UEs based on the received CLI measurement value manager.

Figure 16:
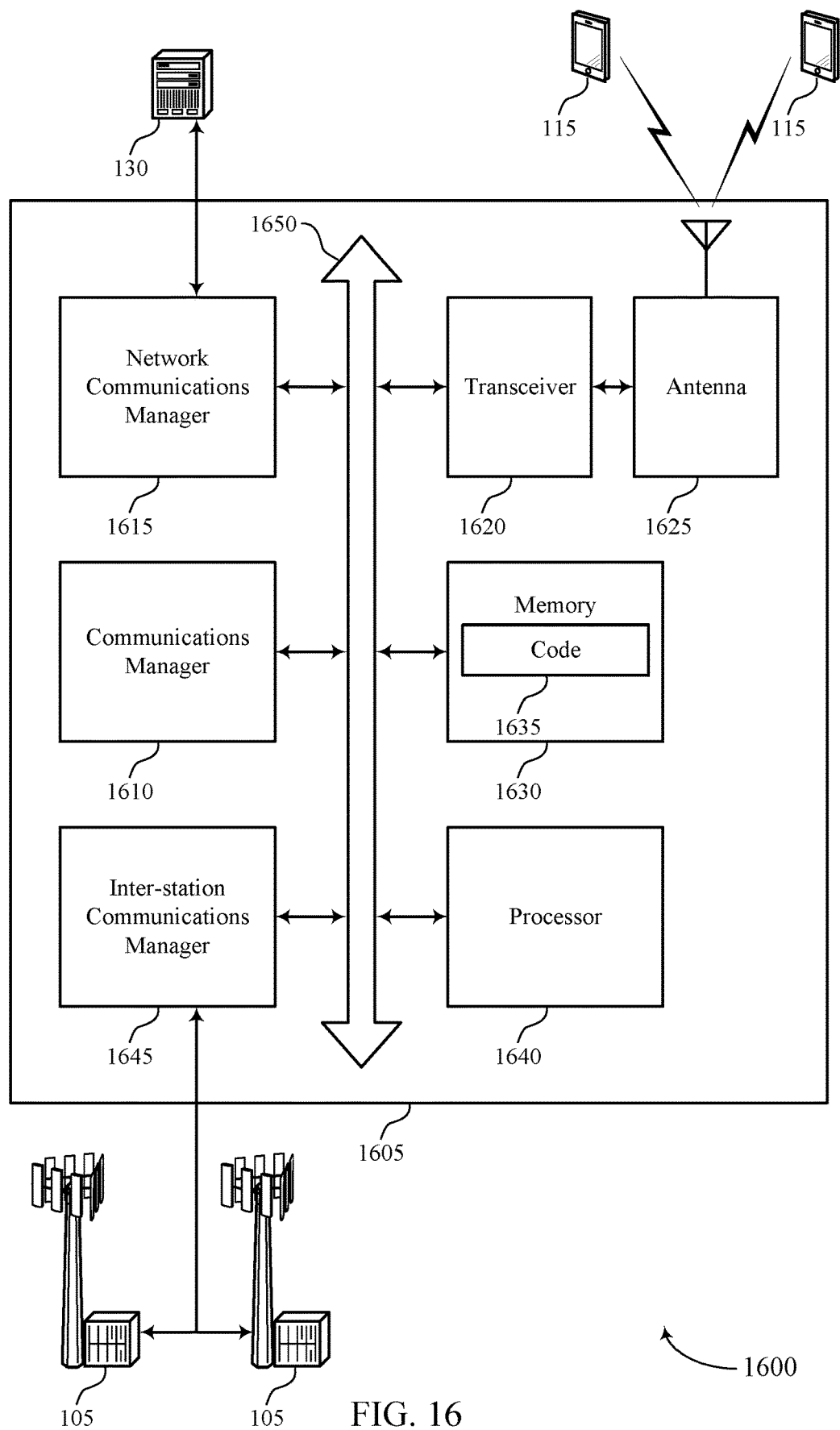
FIG. 16 shows a diagram of a system including a device that supports handling of absence of interference for CLI measurement in accordance with aspects of the present disclosure.

FIG. 16 shows a diagram of a system 1600 including a device 1605 that supports handling of absence of interference for CLI measurement in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may configure, for a UE, a set of CLI measurement occasions for a set of CLI measurements, receive, from the UE based on configuring the set of CLI measurement occasions, a CLI measurement report including a filtered CLI measurement value corresponding to the set of CLI measurement occasions and an indication of at least a first counter value associated with a first subset of measurements associated with the set of CLI measurement occasions that satisfy a CLI measurement threshold or a second counter value associated with a second subset of measurements associated with the set of CLI measurement occasions that do not satisfy the CLI measurement threshold, and schedule communications for the UE and at least a second UE based on receiving the CLI measurement report.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting handling of absence of interference for CLI measurement).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
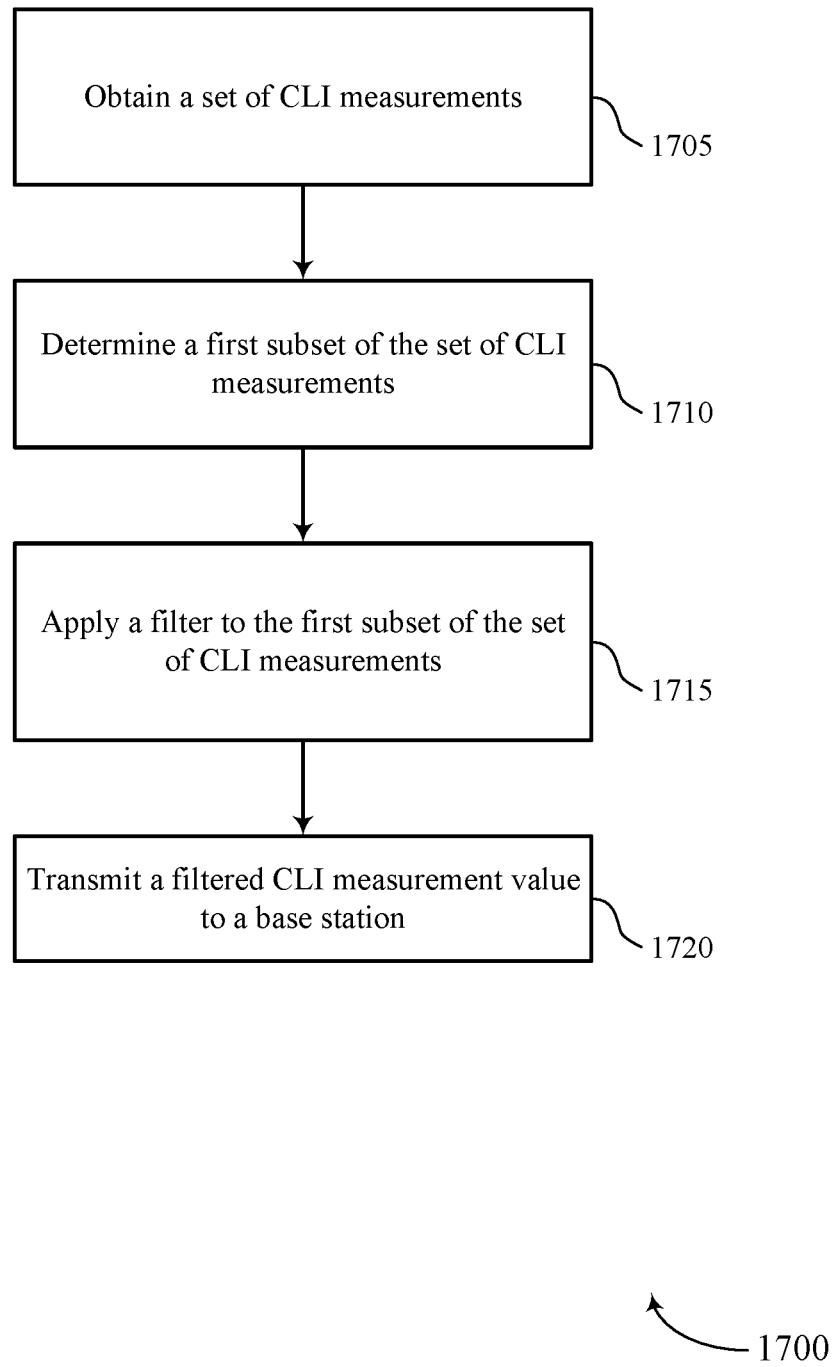
FIGS. 17 and 18 show flowcharts illustrating methods that support handling of absence of interference for CLI measurement in accordance with aspects of the present disclosure.

FIG. 17 shows a flowchart illustrating a method 1700 that supports handling of absence of interference for CLI measurement in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may obtain a set of CLI measurements. Obtaining the set of CLI measurements may be based on a corresponding set of CLI measurement occasions. For example, a base station may configure the UE with one or more CLI measurement occasions. The CLI measurement occasions may include resources for performing CLI measurements. The UE may measure CLI (e.g., RSSI or RSRP) during the CLI measurement occasions, and may thus obtain the set of CLI measurements. The operations of 1705 may be performed according to the methods described herein. In some examples, aspects of the operations of 1705 may be performed by a CLI measurement manager as described with reference to FIGS. 9 through 12.

At 1710, the UE may determine a first subset of the set of CLI measurements that satisfy a CLI threshold. For example, the UE may identify a CLI threshold, which may be indicated to the UE by a base station, preconfigured, predefined, or otherwise identified by the UE. The UE may compare CLI measurements of the set of CLI measurements to the threshold. The UE may also identify a second subset of the CLI measurements that do not satisfy the threshold. The operations of 1710 may be performed according to the methods described herein. In some examples, aspects of the operations of 1710 may be performed by a CLI measurement threshold manager as described with reference to FIGS. 9 through 12.

At 1715, the UE may apply a filter to the first subset of the set of CLI measurements to obtain a filtered CLI measurement value. For example, the UE may update a previously generated filtered CLI measurement value based on the current CLI measurement. The operations of 1715 may be performed according to the methods described herein. In some examples, aspects of the operations of 1715 may be performed by a filter manager as described with reference to FIGS. 9 through 12.

At 1720, the UE may transmit the filtered CLI measurement value to a base station. For example, the UE may transmit a CLI measurement report that may include the filtered CLI measurement value, one or more counter values or a relationship between counter values, or a combination thereof. The operations of 1720 may be performed according to the methods described herein. In some examples, aspects of the operations of 1720 may be performed by a CLI measurement manager as described with reference to FIGS. 9 through 12.

Figure 18:
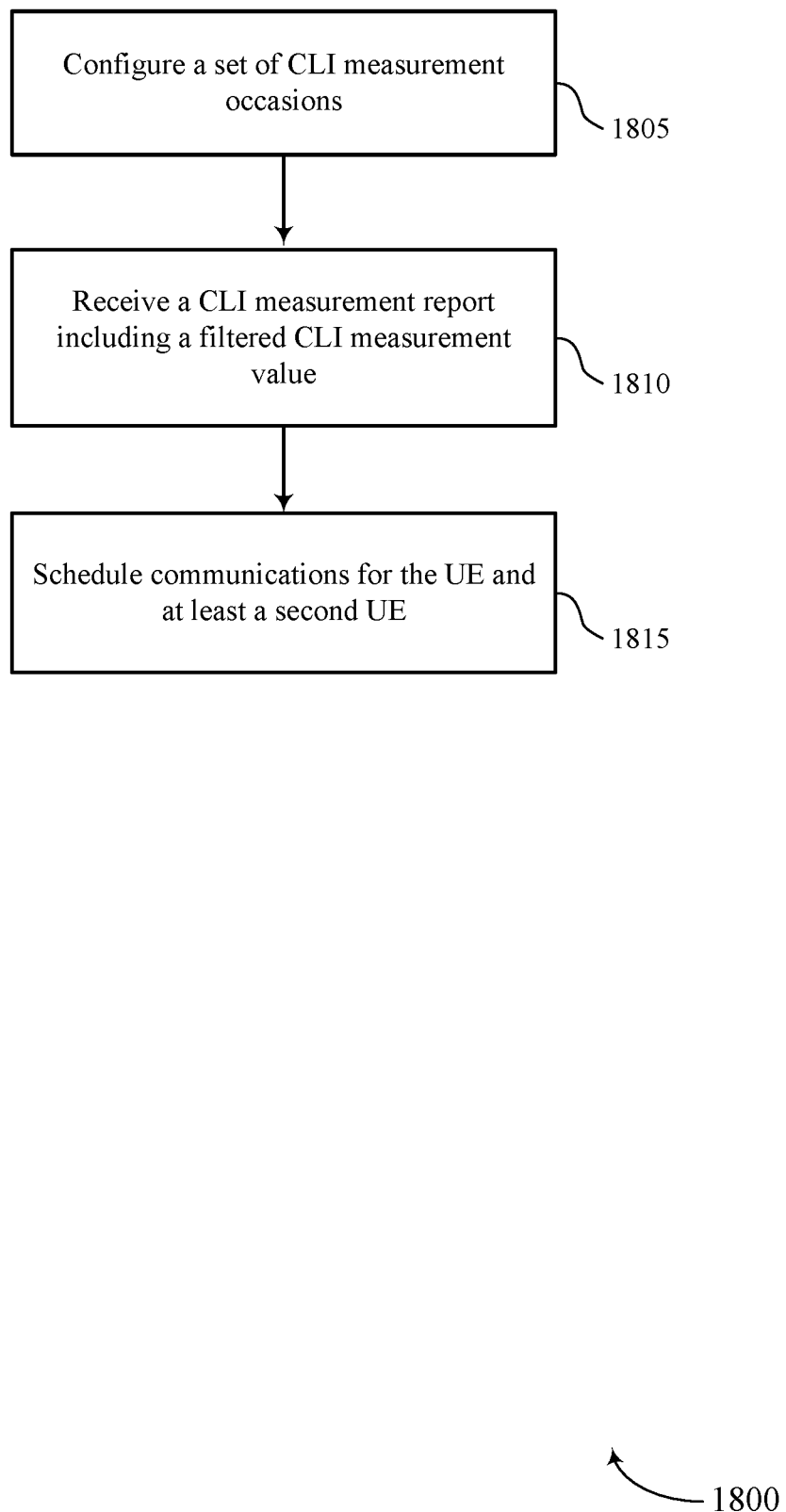

FIG. 18 shows a flowchart illustrating a method 1800 that supports handling of absence of interference for CLI measurement in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 1805, the base station may configure a set of CLI measurement occasions for a set of CLI measurements. The operations of 1805 may be performed according to the methods described herein. In some examples, aspects of the operations of 1805 may be performed by a CLI measurement occasion manager as described with reference to FIGS. 13 through 16.

At 1810, the base station may receive a CLI measurement report including a filtered CLI measurement value. For example, the base station may receive, from the UE based on configuring the set of CLI measurement occasions, a CLI measurement report that includes a filtered CLI measurement value corresponding to the set of CLI measurement occasions and an indication of at least a first counter value associated with a first subset of measurements associated with the set of CLI measurement occasions that satisfy a CLI measurement threshold or a second counter value associated with a second subset of measurements associated with the set of CLI measurement occasions that do not satisfy the CLI measurement threshold. The operations of 1810 may be performed according to the methods described herein. In some examples, aspects of the operations of 1810 may be performed by a CLI measurement report manager as described with reference to FIGS. 13 through 16.

At 1815, the base station may schedule communications for the UE and at least a second UE based on receiving the CLI measurement report. For example, the base station may schedule communications for the UE and at least a second UE. For example, the base station may update a TDD configuration for one or more UEs, or may schedule communications, or select communication beams for the UEs, or the like, based on the CLI measurement report. The operations of 1815 may be performed according to the methods described herein. In some examples, aspects of the operations of 1815 may be performed by a scheduling manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: obtaining a set of cross-link interference measurements based at least in part on a corresponding set of cross-link interference measurement occasions; determining a first subset of the set of cross-link interference measurements that satisfy a cross-link interference measurement threshold; applying a filter to the first subset of the set of cross-link interference measurements to obtain a filtered cross-link interference measurement value; and transmitting the filtered cross-link interference measurement value to a base station.

Aspect 2: The method of aspect 1, further comprising: determining a second subset of the set of cross-link interference measurements that do not satisfy the cross-link interference measurement threshold; and suppressing the filter for the second subset of the set of cross-link interference measurements, wherein the filtered cross-link interference measurement value is based at least in part on suppressing the filter for the second subset of the set of cross-link interference measurements.

Aspect 3: The method of aspect 2, wherein applying the filter comprises: adjusting a coefficient value for a current cross-link interference measurement of the first subset of the set of cross-link interference measurements based at least in part on a number of cross-link interference measurements in the second subset of the set of cross-link interference measurements.

Aspect 4: The method of any of aspects 2 through 3, further comprising: performing a first cross-link interference measurement; initiating a counter based at least in part on determining the first cross-link interference measurement is in the first subset of the set of cross-link interference measurements; performing one or more additional cross-link interference measurements; and incrementing the counter for each of the one or more additional cross-link interference measurements based at least in part on determining that the one or more additional cross-link interference measurements are in the second subset of the set of cross-link interference measurements.

Aspect 5: The method of aspect 4, further comprising: performing a second cross-link interference measurement subsequent to the one or more additional cross-link interference measurements; and resetting the counter based at least in part on determining that the second cross-link interference measurement is in the first subset of the set of cross-link interference measurements.

Aspect 6: The method of aspect 5, wherein applying the filter comprises: adjusting a coefficient value for the second cross-link interference measurement of the first subset of the set of cross-link interference measurements based at least in part on a last value of the counter prior to resetting the counter.

Aspect 7: The method of any of aspects 4 through 6, further comprising: determining, based at least in part on incrementing the counter, that an incremented counter value satisfies a counter threshold; generating, based at least in part on determining that the incremented counter value satisfies the counter threshold, a cross-link interference measurement value indicating a lack of detected cross-link interference; and transmitting the cross-link interference measurement value to the base station.

Aspect 8: The method of aspect 7, further comprising: performing a second cross-link interference measurement subsequent to the one or more additional cross-link interference measurements; and setting a coefficient value equal to one for the second cross-link interference measurement based at least in part on determining that the incremented counter value satisfies the counter threshold, wherein applying the filter to the first subset of the set of cross-link interference measurements is based at least in part on the coefficient value.

Aspect 9: The method of any of aspects 2 through 8, further comprising: incrementing a first counter for each cross-link interference measurement of the first subset of the set of cross-link interference measurements to obtain a first counter value; and incrementing a second counter for each cross-link interference measurement of the second subset of the set of cross-link interference measurements to obtain a second counter value.

Aspect 10: The method of aspect 9, wherein transmitting the filtered cross-link interference measurement value comprises: transmitting a cross-link interference measurement report comprising the filtered cross-link interference measurement value and an indication of the first counter value, the second counter value, a ratio between the first counter value and the second counter value, a relationship between the first counter value and the second counter value, or any combination thereof.

Aspect 11: The method of any of aspects 9 through 10, further comprising: determining that a first ratio between the first counter value and the second counter value or a second ratio between the first counter value and a sum of the first counter value and the second counter value, or a third ratio between the second counter value and a sum of the first counter value and the second counter value satisfies a threshold value, wherein transmitting the filtered cross-link interference measurement value is based at least in part on determining that the first ratio or the second ratio satisfies the threshold value.

Aspect 12: The method of any of aspects 9 through 11, further comprising: resetting, based at least in part on transmitting the filtered cross-link interference measurement value to the base station, the first counter and the second counter.

Aspect 13: A method for wireless communications at a base station, comprising: configuring, for a UE, a set of cross-link interference measurement occasions for a set of cross-link interference measurements; receiving, from the UE based at least in part on configuring the set of cross-link interference measurement occasions, a cross-link interference measurement report comprising a filtered cross-link interference measurement value corresponding to the set of cross-link interference measurement occasions and an indication of at least a first counter value associated with a first subset of measurements associated with the set of cross-link interference measurement occasions that satisfy a cross-link interference measurement threshold or a second counter value associated with a second subset of measurements associated with the set of cross-link interference measurement occasions that do not satisfy the cross-link interference measurement threshold; and scheduling communications for the UE and at least a second UE based at least in part on receiving the cross-link interference measurement report.

Aspect 14: The method of aspect 13, wherein the cross-link interference measurement report further comprises an indication of a relationship between the first counter value and the second counter value comprising a first ratio between the first counter value and the second counter value, a second ratio between the first counter value and a sum of the first counter value and the second counter value, a third ratio between the second counter value and a sum of the first counter value and the second counter value, or a combination thereof.

Aspect 15: The method of any of aspects 13 through 14, wherein the cross-link interference measurement report comprises an indication of a lack of detected cross-link interference during the set of cross-link interference measurement occasions.

Aspect 16: The method of aspect 15, wherein receiving the cross-link interference measurement report is based at least in part on the second counter value satisfying a maximum counter value.

Aspect 17: An apparatus for wireless communications at a UE, comprising a processor; memory coupled with the processor; and instructions stored in the memory and executable by the processor to cause the apparatus to perform a method of any of aspects 1 through 12.

Aspect 18: An apparatus for wireless communications at a UE, comprising at least one means for performing a method of any of aspects 1 through 12.

Aspect 19: A non-transitory computer-readable medium storing code for wireless communications at a UE, the code comprising instructions executable by a processor to perform a method of any of aspects 1 through 12.

Aspect 20: An apparatus for wireless communications at a base station, comprising a processor; memory coupled with the processor; and instructions stored in the memory and executable by the processor to cause the apparatus to perform a method of any of aspects 13 through 16.

Aspect 21: An apparatus for wireless communications at a base station, comprising at least one means for performing a method of any of aspects 13 through 16.

Aspect 22: A non-transitory computer-readable medium storing code for wireless communications at a base station, the code comprising instructions executable by a processor to perform a method of any of aspects 13 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   a processor,
   memory coupled with the processor; and
   instructions stored in the memory and executable by the processor to cause the apparatus to:
      obtain a set of cross-link interference measurements based at least in part on a corresponding set of cross-link interference measurement occasions;
      determine a first subset of the set of cross-link interference measurements that satisfy a cross-link interference measurement threshold and a second subset of the set of cross-link interference measurements that do not satisfy the cross-link interference measurement threshold;
      apply a filter to the first subset of the set of cross-link interference measurements to obtain a filtered cross-link interference measurement value; and
      transmit, to a network entity, a cross-link interference measurement report comprising the filtered cross-link interference measurement value, and an indication of a first counter value for each cross-link interference measurement of the first subset, an indication of a second counter value for each cross-link interference measurement in the second subset, a ratio between the first counter value and the second counter value, a relationship between the first counter value and the second counter value, or any combination thereof.

2. The apparatus of claim 1, wherein the instructions are further executable by the processor to cause the apparatus to:
   suppress the filter for the second subset of the set of cross-link interference measurements, wherein the filtered cross-link interference measurement value is based at least in part on suppressing the filter for the second subset of the set of cross-link interference measurements.

3. The apparatus of claim 2, wherein the instructions to apply the filter are executable by the processor to cause the apparatus to:
   adjust a coefficient value for a current cross-link interference measurement of the first subset of the set of cross-link interference measurements based at least in part on a number of cross-link interference measurements in the second subset of the set of cross-link interference measurements.

4. The apparatus of claim 2, wherein the instructions are further executable by the processor to cause the apparatus to:
   perform a first cross-link interference measurement;
   initiate a counter based at least in part on determining the first cross-link interference measurement is in the first subset of the set of cross-link interference measurements;
   perform one or more additional cross-link interference measurements; and
   increment the counter for each of the one or more additional cross-link interference measurements based at least in part on determining that the one or more additional cross-link interference measurements are in the second subset of the set of cross-link interference measurements.

5. The apparatus of claim 4, wherein the instructions are further executable by the processor to cause the apparatus to:
   perform a second cross-link interference measurement subsequent to the one or more additional cross-link interference measurements; and
   reset the counter based at least in part on determining that the second cross-link interference measurement is in the first subset of the set of cross-link interference measurements.

6. The apparatus of claim 5, wherein the instructions to apply the filter are executable by the processor to cause the apparatus to:
   adjust a coefficient value for the second cross-link interference measurement of the first subset of the set of cross-link interference measurements based at least in part on a last value of the counter prior to resetting the counter.

7. The apparatus of claim 4, wherein the instructions are further executable by the processor to cause the apparatus to:
   determine, based at least in part on incrementing the counter, that an incremented counter value satisfies a counter threshold;
   generate, based at least in part on determining that the incremented counter value satisfies the counter threshold, a cross-link interference measurement value indicating a lack of detected cross-link interference; and
   transmit the cross-link interference measurement value to the network entity.

8. The apparatus of claim 7, wherein the instructions are further executable by the processor to cause the apparatus to:
   perform a second cross-link interference measurement subsequent to the one or more additional cross-link interference measurements; and
   set a coefficient value equal to one for the second cross-link interference measurement based at least in part on determining that the incremented counter value satisfies the counter threshold, wherein applying the filter to the first subset of the set of cross-link interference measurements is based at least in part on the coefficient value.

9. The apparatus of claim 2, wherein the instructions are further executable by the processor to cause the apparatus to:
increment a first counter for each cross-link interference measurement of the first subset of the set of cross-link interference measurements to obtain the first counter value; and
increment a second counter for each cross-link interference measurement of the second subset of the set of cross-link interference measurements to obtain the second counter value.

10. The apparatus of claim 9, wherein the instructions are further executable by the processor to cause the apparatus to:
determine that the ratio between the first counter value and the second counter value, a second ratio between the first counter value and a sum of the first counter value and the second counter value, or a third ratio between the second counter value and a sum of the first counter value and the second counter value satisfies a threshold value, wherein transmitting the filtered cross-link interference measurement value is based at least in part on determining that the ratio, the second ratio, or the third ratio satisfies the threshold value.

11. The apparatus of claim 9, wherein the instructions are further executable by the processor to cause the apparatus to:
reset, based at least in part on transmitting the filtered cross-link interference measurement value to the network entity, the first counter and the second counter.

12. An apparatus for wireless communications at a network entity, comprising:
a processor,
memory coupled with the processor; and
instructions stored in the memory and executable by the processor to cause the apparatus to:
configure, for a user equipment (UE), a set of cross-link interference measurement occasions for a set of cross-link interference measurements;
receive, from the UE based at least in part on configuring the set of cross-link interference measurement occasions, a cross-link interference measurement report comprising a filtered cross-link interference measurement value corresponding to the set of cross-link interference measurement occasions and an indication of at least a first counter value associated with a first subset of measurements associated with the set of cross-link interference measurement occasions that satisfy a cross-link interference measurement threshold, a second counter value associated with a second subset of measurements associated with the set of cross-link interference measurement occasions that do not satisfy the cross-link interference measurement threshold, a ratio between the first counter value and the second counter value, a relationship between the first counter value and the second counter value, or any combination thereof; and
schedule communications for the UE and at least a second UE based at least in part on receiving the cross-link interference measurement report.

13. The apparatus of claim 12, wherein the relationship comprises a second ratio between the first counter value and a sum of the first counter value and the second counter value, a third ratio between the second counter value and a sum of the first counter value and the second counter value, or a combination thereof.

14. The apparatus of claim 12, wherein the cross-link interference measurement report comprises an indication of a lack of detected cross-link interference during the set of cross-link interference measurement occasions.

15. The apparatus of claim 14, wherein receiving the cross-link interference measurement report is based at least in part on the second counter value satisfying a maximum counter value.

16. A method for wireless communications at a user equipment (UE), comprising:
obtaining a set of cross-link interference measurements based at least in part on a corresponding set of cross-link interference measurement occasions;
determining a first subset of the set of cross-link interference measurements that satisfy a cross-link interference measurement threshold and a second subset of the set of cross-link interference measurements that do not satisfy the cross-link interference measurement threshold;
applying a filter to the first subset of the set of cross-link interference measurements to obtain a filtered cross-link interference measurement value; and
transmitting, to a network entity, a cross-link interference measurement report comprising the filtered cross-link interference measurement value, and an indication of a first counter value for each cross-link interference measurement of the first subset, an indication of a second counter value for each cross-link interference measurement in the second subset, a ratio between the first counter value and the second counter value, a relationship between the first counter value and the second counter value, or any combination thereof.

17. The method of claim 16, further comprising:
suppressing the filter for the second subset of the set of cross-link interference measurements, wherein the filtered cross-link interference measurement value is based at least in part on suppressing the filter for the second subset of the set of cross-link interference measurements.

18. The method of claim 17, wherein applying the filter comprises:
adjusting a coefficient value for a current cross-link interference measurement of the first subset of the set of cross-link interference measurements based at least in part on a number of cross-link interference measurements in the second subset of the set of cross-link interference measurements.

19. The method of claim 17, further comprising:
performing a first cross-link interference measurement;
initiating a counter based at least in part on determining the first cross-link interference measurement is in the first subset of the set of cross-link interference measurements;
performing one or more additional cross-link interference measurements; and
incrementing the counter for each of the one or more additional cross-link interference measurements based at least in part on determining that the one or more additional cross-link interference measurements are in the second subset of the set of cross-link interference measurements.

20. The method of claim 19, further comprising:
performing a second cross-link interference measurement subsequent to the one or more additional cross-link interference measurements; and
resetting the counter based at least in part on determining that the second cross-link interference measurement is in the first subset of the set of cross-link interference measurements.

21. The method of claim 20, wherein applying the filter comprises:
adjusting a coefficient value for the second cross-link interference measurement of the first subset of the set of cross-link interference measurements based at least in part on a last value of the counter prior to resetting the counter.

22. The method of claim 17, further comprising:
determining, based at least in part on incrementing a counter, that an incremented counter value satisfies a counter threshold;
generating, based at least in part on determining that the incremented counter value satisfies the counter threshold, a cross-link interference measurement value indicating a lack of detected cross-link interference; and
transmitting the cross-link interference measurement value to the network entity.

23. The method of claim 22, further comprising:
performing a second cross-link interference measurement subsequent to one or more additional cross-link interference measurements; and
setting a coefficient value equal to one for the second cross-link interference measurement based at least in part on determining that the incremented counter value satisfies the counter threshold, wherein applying the filter to the first subset of the set of cross-link interference measurements is based at least in part on the coefficient value.

24. The method of claim 17, further comprising:
incrementing a first counter for each cross-link interference measurement of the first subset of the set of cross-link interference measurements to obtain the first counter value; and
incrementing a second counter for each cross-link interference measurement of the second subset of the set of cross-link interference measurements to obtain the second counter value.

25. The method of claim 24, further comprising:
determining that the ratio between the first counter value and the second counter value, a second ratio between the first counter value and a sum of the first counter value and the second counter value, or a third ratio between the second counter value and a sum of the first counter value and the second counter value satisfies a threshold value, wherein transmitting the filtered cross-link interference measurement value is based at least in part on determining that the ratio, the second ratio, or the third ratio satisfies the threshold value.

26. The method of claim 24, further comprising:
resetting, based at least in part on transmitting the filtered cross-link interference measurement value to the network entity, the first counter and the second counter.

27. A method for wireless communications at a network entity, comprising:
configuring, for a user equipment (UE), a set of cross-link interference measurement occasions for a set of cross-link interference measurements;
receiving, from the UE based at least in part on configuring the set of cross-link interference measurement occasions, a cross-link interference measurement report comprising a filtered cross-link interference measurement value corresponding to the set of cross-link interference measurement occasions and an indication of at least a first counter value associated with a first subset of measurements associated with the set of cross-link interference measurement occasions that satisfy a cross-link interference measurement threshold, a second counter value associated with a second subset of measurements associated with the set of cross-link interference measurement occasions that do not satisfy the cross-link interference measurement threshold, a ratio between the first counter value and the second counter value, a relationship between the first counter value and the second counter value, or any combination thereof; and
scheduling communications for the UE and at least a second UE based at least in part on receiving the cross-link interference measurement report.

28. The method of claim 27, wherein the relationship comprises a second ratio between the first counter value and a sum of the first counter value and the second counter value, a third ratio between the second counter value and a sum of the first counter value and the second counter value, or a combination thereof.

* * * * *